US010286809B2

(12) United States Patent
Igarashi et al.

(10) Patent No.: US 10,286,809 B2
(45) Date of Patent: May 14, 2019

(54) POWER MANAGEMENT DEVICE, POWER MANAGEMENT SYSTEM, AND MOTOR VEHICLE

(71) Applicant: Mitsubishi Electric Corporation, Chiyoda-ku (JP)

(72) Inventors: Yuji Igarashi, Tokyo (JP); Masashi Watanabe, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 190 days.

(21) Appl. No.: 15/323,878

(22) PCT Filed: Feb. 26, 2015

(86) PCT No.: PCT/JP2015/055653
§ 371 (c)(1),
(2) Date: Jan. 4, 2017

(87) PCT Pub. No.: WO2016/013243
PCT Pub. Date: Jan. 28, 2016

(65) Prior Publication Data
US 2017/0151891 A1 Jun. 1, 2017

(30) Foreign Application Priority Data
Jul. 24, 2014 (JP) ................................. 2014-150553

(51) Int. Cl.
*B60L 7/10* (2006.01)
*B60L 15/20* (2006.01)
(Continued)

(52) U.S. Cl.
CPC ............. *B60L 15/2045* (2013.01); *B60L 7/10* (2013.01); *B60L 7/14* (2013.01); *B60L 11/14* (2013.01);
(Continued)

(58) Field of Classification Search
None
See application file for complete search history.

(56) References Cited

U.S. PATENT DOCUMENTS 5,913,917 A * 6/1999 Murphy .............. B60R 16/0232
701/123
8,433,466 B2 4/2013 Yamada et al.
(Continued)

FOREIGN PATENT DOCUMENTS

CN 201151352 Y 11/2008
CN 103261855 A 8/2013
(Continued)

OTHER PUBLICATIONS

International Search Report dated Apr. 28, 2015, in PCT/JP2015/055653, filed Feb. 26, 2015.
(Continued)

*Primary Examiner* — Jonathan M Dager
*Assistant Examiner* — Garrett F Evans
(74) *Attorney, Agent, or Firm* — Oblon, McClelland, Maier & Neustadt, L.L.P.

(57) ABSTRACT

An electric motor is driven using a power stored in a storage battery as a power source. A power management system includes a power management device and a travel control device. The power management device includes a travel control planning unit and a section valid road slope information storage unit. The section valid road slope information storage unit stores section road slope information including information about a slope of a road section where a vehicle travels. On the basis of section valid road slope information read from the section valid road slope information storage unit, the travel control planning unit creates a travel control plan for traveling the vehicle. The travel control device performs travel control of the vehicle on the basis of the travel control plan. One of the section valid road
(Continued)

slope information which shows a downward slope in traveling of the vehicle has a slope steeper than a predetermined slope depending on the vehicle.

18 Claims, 9 Drawing Sheets

(51) Int. Cl.
    *B60L 7/14*     (2006.01)
    *B60L 11/14*     (2006.01)

(52) U.S. Cl.
    CPC ....... *B60L 15/2018* (2013.01); *B60L 2240/12* (2013.01); *B60L 2240/26* (2013.01); *B60L 2240/642* (2013.01); *B60L 2260/50* (2013.01); *Y02T 10/70* (2013.01); *Y02T 10/7077* (2013.01); *Y02T 10/7258* (2013.01); *Y02T 10/7291* (2013.01); *Y02T 90/16* (2013.01); *Y10S 903/906* (2013.01)

(56) References Cited

U.S. PATENT DOCUMENTS

| | | | |
|---|---|---|---|
| 8,615,342 B2 | 12/2013 | Suganuma et al. | |
| 2008/0042489 A1* | 2/2008 | Lewis | B60K 6/48 303/152 |
| 2013/0103238 A1* | 4/2013 | Yu | G06F 17/00 701/22 |

FOREIGN PATENT DOCUMENTS

| | | |
|---|---|---|
| CN | 103802821 A | 5/2014 |
| JP | 11-8907 A | 1/1999 |
| JP | 11-75304 A | 3/1999 |
| JP | 2002-36903 A | 2/2002 |
| JP | 2008-196922 A | 8/2008 |
| JP | 2010-120552 A | 6/2010 |
| JP | 2011-6047 A | 1/2011 |
| JP | 2013-2850 A | 1/2013 |
| JP | 5151619 B2 | 2/2013 |
| JP | 2013-120061 A | 6/2013 |

OTHER PUBLICATIONS

Japanese Office Action dated Apr. 12, 2016, in Japanese Patent Application No. 2016-504401 (7 pages, with partial English translation).

International Preliminary Report on Patentability and Written Opinion dated Feb. 2, 2017 in PCT/JP2015/055653 (with English language translation).

Combined Office Action and Search Report dated Aug. 10, 2018 in Chinese Patent Application No. 201580040019.1, 13 pages (with English translation).

* cited by examiner

POWER MANAGEMENT DEVICE, POWER MANAGEMENT SYSTEM, AND MOTOR VEHICLE

TECHNICAL FIELD

The present invention relates to a technique for managing power in a vehicle.

BACKGROUND ART

In recent years, from viewpoints of emission reduction of carbon dioxide and efficient utilization of energy, an electric motor vehicle which utilizes an electric motor (hereinafter also referred to as a "motor") as a driving source is put into practical use. The electric motor uses electric energy charged in a storage battery (hereinafter also referred to as a "battery") as an electric power source.

However, an energy density of the battery for the electric motor vehicle is small as compared with gasoline. Because of this, a cruising range at a full charge is as short as about 100 to 200 km. Since power is consumed by an electric load, such as an air conditioner, in the electric motor vehicle, the cruising range is further shortened.

Meanwhile, there is proposed an electric type hybrid motor vehicle (hereinafter also referred to as a "hybrid vehicle") which utilizes both electricity and gasoline as an energy source. In the hybrid vehicle, there is proposed a technique for selecting a traveling mode for every road section in which the hybrid vehicle travels. As the traveling mode, for example, an EV mode in which only electric energy is used for driving, or an HV mode in which energy of both electricity and gasoline are used for driving is employed. Due to such a selection, a battery is charged by the electric energy obtained by traveling of the hybrid vehicle, and the electric energy charged in the battery is efficiently utilized.

For example, in Patent Document 1 described below, a technique for obtaining information about traveling energy consumed when a vehicle has actually traveled in every road section and about regenerative energy (in Patent Document 1, energy charged to a battery by AC power generated by a motor by resistance force during deceleration) and for storing the information in a recording medium as history data is disclosed. Also, calculation of a difference between an average value or a maximum value of the traveling energy in a case where the vehicle has traveled in the same road section for a plurality of times and an average value or a minimum value of the regenerative energy is performed tracing back an estimated route from a departure place to a destination. With this configuration, a section in which the vehicle can travel up to the destination in an EV mode (an "EV finish section") is determined.

In Patent Document 1, employment of an HV mode in a section other than the EV finish section is proposed. For example, a rechargeable point serves as a destination point, a section which employs the HV mode is disposed before the EV finish section. Also, when the vehicle arrives at the destination point, control is performed so that a residual quantity of the battery is set to a lower limit value.

Further, in Patent Document 1, a technique for determining a starting point of the EV finish section by learning processing which uses the history data of a travelling situation when the vehicle has traveled before in the same road section (this affects power consumption of the battery) is disclosed. With this configuration, there is proposed lowering of the battery residual quantity to the lower limit value at the destination point more accurately.

It should be noted that, in Patent Document 2, energy calculation under predetermined conditions which depend on a vehicle is described.

PRIOR ART DOCUMENTS

Patent Documents

Patent Document 1: Japanese Patent No. 5151619
Patent Document 2: Japanese Patent Application Laid-Open No. 2002-36963

SUMMARY OF INVENTION

Problems to be Solved by the Invention

The "EV finish section" in the technique in Patent Document 1 is effective in a case where the rechargeable destination is determined, but is not effectively used in a case where the destination is not determined.

Further, since the history data when the vehicle has actually traveled in every road section is needed to determine the "EV finish section", it is necessary to have a data storage device with a large capacity ranging from several hundreds of gigabytes to several terabytes (for example, an HDD (Hard Disk Drive)).

Further, even in the same road section, a quantity of the traveling energy or the electric energy contributing to charging of the battery by travel (hereinafter, simply referred to as "regenerative energy") is different according to a type of a motor vehicle (hereinafter, referred to as a vehicle type). Hence, it is necessary that the history data when the vehicle has actually traveled in every road section is stored for each of the vehicle types. Due to this necessity, a larger capacity is required to the data storage device.

Further, since the history data, such as the traveling energy when the vehicle has actually traveled or the regenerative energy, is required, there is a case where necessity for collecting new history data arises every time a new motor vehicle is developed.

Moreover, the traveling energy or the regenerative energy is different depending on driving characteristics of a driver (the way the driver presses a brake pedal, the way the driver presses an accelerator, a traveling speed). Hence, even when the aforementioned "EV finish section" is determined, there is a case where the EV mode cannot be actually continued up to a destination.

Indeed, in Patent Document 1, also taking this point into account, a technique for collecting and learning information, such as engine speed or acceleration in every road section, in an information center via communication, such as wireless, is disclosed. Moreover, on the basis of the learning, there is also proposed notification of a brake level or an acceleration level capable of continuing the EV mode in the "EV finish section" to the driver.

However, in order to realize such learning and notification, it is necessary to specify the destination having a rechargeable facility and to have a storage device for storing the history data with a large capacity. Moreover, when a new motor vehicle is developed, a necessity of collecting history data of the motor vehicle arises. In consideration of such circumstances, it is not easy to realize the aforementioned learning and notification.

If the brake level or the acceleration level is notified by displaying and making the driver visually recognize the brake level or the acceleration level, there is also a possibility that driving operation is complicated.

The present invention has been accomplished to solve the above-described problems, and an object thereof is to provide a technique for performing power management of a vehicle by a storage device with a small capacity.

Means for Solving the Problems

A first aspect of a power management device includes: an information storage unit for storing road slope information including information about a slope of a road section in which a vehicle travels in association with the road section; and a travel control planning unit for reading the road slope information from the information storage unit and creating a travel control plan traveling of the vehicle on the basis of the road slope information. One of the road slope information which shows a downward slope in traveling of the vehicle has a slope steeper than a predetermined slope depending on the vehicle. The predetermined slope is a slope according to a vehicle characteristic of the vehicle. The vehicle characteristic includes at least any one of a car weight of the vehicle and performance of a regenerative brake of the vehicle.

The road slope information includes a start position, an end position, and a slope of a regenerative section serving as a section in which regenerative energy can be obtained by traveling of the vehicle.

The vehicle has a storage battery for storing the regenerative energy and is driven by using power at least stored in the storage battery as a power source.

The travel control planning unit creates the travel control plan in the road section which is depending on results of determination of whether or not the vehicle can travel until arriving in the regenerative section by the power stored in the storage battery, whether or not the storage battery can recover entire electric energy contributed to charging of the storage battery in the regenerative section, and whether or not the vehicle can travel in the road section by the power.

A second aspect of the power management device is the first aspect.

And the travel control planning unit creates the travel control plan by using energy consumed when the vehicle travels a distance of a route serving as an upward slope in the traveling in the road section and a unit distance thereof, regenerative energy obtained when the vehicle travels a distance of a route serving as the downward slope in the traveling in the road section and a unit distance thereof, and energy consumed when the vehicle travels a distance of a route serving as a flat road in the road section and a unit distance thereof.

A third aspect of the power management device according to the present invention is the first aspect, wherein the energy consumed when the vehicle travels the unit distance of the route serving as the flat road in the road section depends on an average value of a traveling speed of the vehicle.

Also, when a difference between the average value used in creating the travel control plan and the average value during travel control based on the travel control plan is a predetermined value or more, the travel control plan is created again.

A fourth aspect of the power management device is the first aspect, wherein the road slope information includes a start position, an end position, and a road slope of the road section in association with a plurality of road sections in a region where energy consumed in traveling of the vehicle is equal.

A fifth aspect of the power management device includes: an information storage unit for storing road slope information including information about a slope of a road section in which a vehicle travels in association with the road section. One of the road slope information which shows a downward slope in traveling of the vehicle has a slope steeper than a predetermined slope depending on the vehicle. The predetermined slope is a slope according to a vehicle characteristic of the vehicle. The vehicle characteristic includes at least any one of a car weight of the vehicle and performance of a regenerative brake of the vehicle. The road slope information includes an electric energy quantity consumed or regenerated at a curve in the road section.

A sixth aspect of the power management device includes: an information storage unit for storing road slope information including information about a slope of a road section in which a vehicle travels in association with the road section. One of the road slope information which shows a downward slope in traveling of the vehicle has a slope steeper than a predetermined slope depending on the vehicle. The predetermined slope is a slope according to a vehicle characteristic of the vehicle. The vehicle characteristic includes at least any one of a car weight of the vehicle and performance of a regenerative brake of the vehicle. The road slope information includes a start position and a curvature of the curve in the road section.

A seventh aspect of the power management device is the first aspect, wherein in a case where a plurality of road sections whose slope directions are in the same direction are adjacent with only a flat road section in between and energy required when the vehicle travels in the flat road section is predetermined energy or less, the road slope information is stored in the information storage unit by gathering the plurality of road sections and the flat road section into one.

A first aspect of a power management system includes: the first aspect of the power management device; and, in a case where a mechanism for accelerating the vehicle is operated when the vehicle travels in the regenerative section, an information providing device for notifying information which recommends not to operate the mechanism.

A second aspect of a power management system includes: any of the first to third aspects of the power management device; and a travel control device for performing travel control of the vehicle based on the travel control plan.

Also, the power management device further includes a nonvolatile storage device for respectively storing a travel distance of the vehicle in the road section successively and the travel control plan.

Also, after the vehicle travels on the basis of the travel control plan and operation of the travel control is temporarily stopped, in an initial operation after the operation is restarted, the travel control device resumes travel control based on the travel distance and the travel control plan stored in the storage device.

A motor vehicle is the vehicle mounted with any of the first to seventh aspects of the power management device or any of the first to second aspects of the power management system.

Effects of the Invention

According to the first aspect of the power management device, a storage capacity of the information storage unit can be small. Since a data quantity is reduced, the required road slope information is retrieved and utilized at a higher speed.

Further, it is possible to recognize the positions of the regenerative section or to calculate the electric energy recoverable in the regenerative section.

Further, a power generation plan in a case where the vehicle travels in an HV mode is easy.

According to the second aspect of the power management device, calculation of an energy balance is simplified to four arithmetic operations, and a necessary arithmetic capacity can be low.

According to the third aspect of the power management device, an error between the travel control plan and actual travel is corrected, and accuracy of the travel control is improved.

According to the fourth aspect of the power management device, even when a destination or a travel route is not determined, the travel control plan in the region can be created, and the travel control plan contributes to travel in which energy is saved.

According to the fifth aspect of the power management device, the energy quantity at the curve is considered in the energy balance calculation, and accuracy of the travel control is improved.

The sixth aspect of the power management device contributes to safe driving, such as deceleration assist before entering the curve.

According to the seventh aspect of the power management device, an information quantity stored in the information storage unit is reduced.

According to the first aspect of the power management system, recovery efficiency of the electric energy in the regenerative section is improved.

According to the second aspect of the power management system, even in a case where the vehicle is temporarily stopped and restarted in the road section, ii is possible to resume the travel control before stoppage of the vehicle.

According to the motor vehicle, the motor vehicle which matches with needs to realize reduction of the energy without increasing a cost for an on-vehicle electric component is obtained.

Objects, features, aspects, and advantages of the present invention will be more evident by the detailed description below and the accompanying drawings.

DESCRIPTION OF EMBODIMENTS

Embodiment 1

<Overall Configuration>

Figure 1:
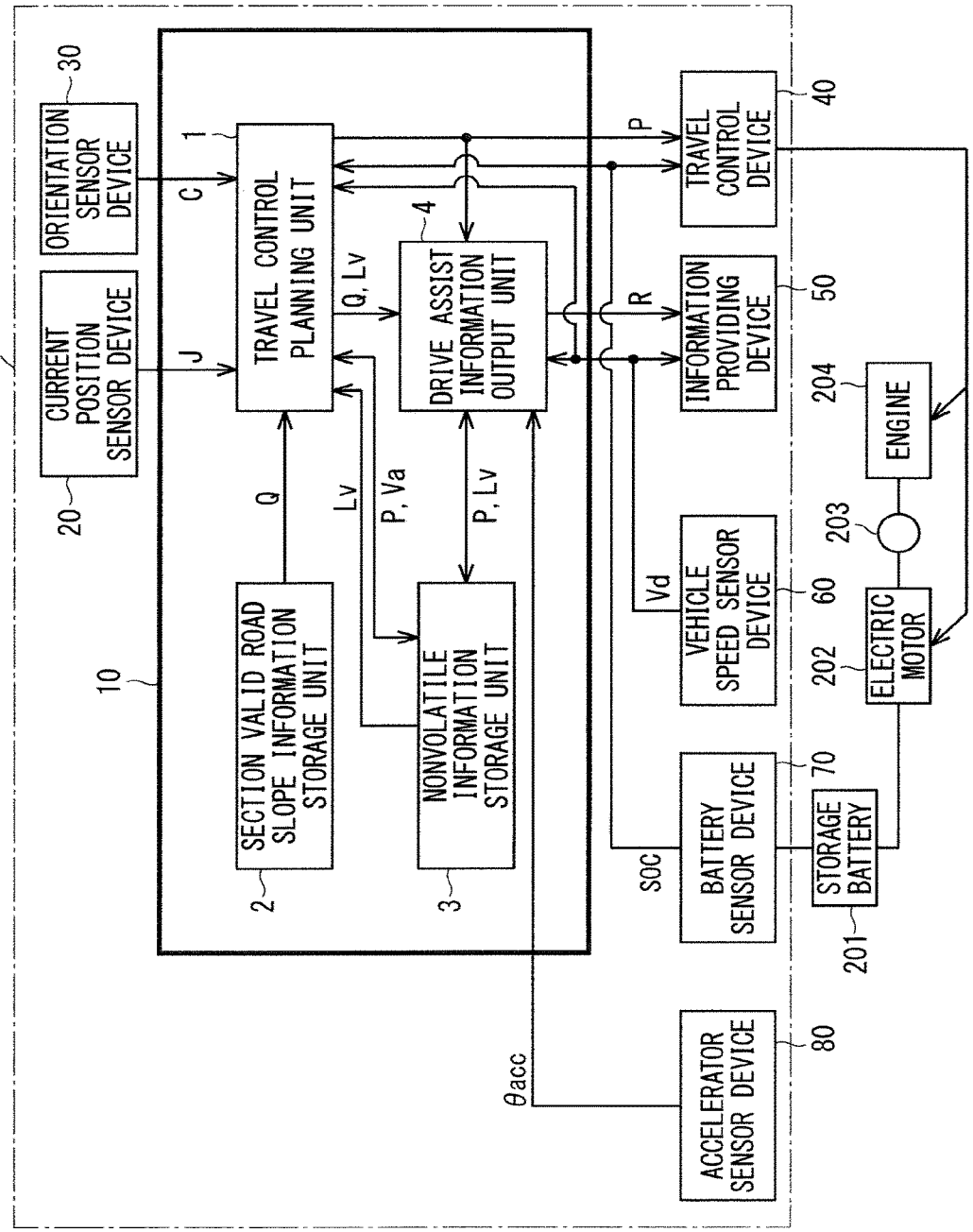
FIG. 1 is a block diagram illustrating a configuration of a power management device and a periphery thereof in an embodiment 1.

FIG. 1 is a block diagram illustrating a configuration of a power management system 100A and a periphery thereof in an embodiment 1 according to the present invention. The power management system 100A is mounted on a vehicle. In the following description, a hybrid vehicle is employed as an example of the vehicle. However, the following explanatory content can be applied to an electric motor vehicle as long as it is focused on charging into a battery.

The power management system 100A includes a power management device 10, a current position sensor device 20, an orientation sensor device 30, a travel control device 40, an information providing device 50, a vehicle speed sensor device 60, a battery sensor device 70, and an accelerator sensor device 80.

The battery sensor device 70 outputs an SOC (State Of Charge) which indicates a battery storage quantity of a storage battery (a battery) 201. The SOC, for example, expresses the battery storage quantity of the battery in percentage, and the SOC at the time of full charge becomes 100%. Hereinafter, the SOC is also employed as a symbol and an expression called the battery storage quantity SOC is adopted.

According to a travel control plan P, which will be mentioned below, the travel control device 40 controls operation of an electric motor 202 or an engine 204.

Wheels 203 of the vehicle rotate with the electric motor 202 and the engine 204 serving as power sources. The vehicle travels by the rotation of the wheels 203. The electric motor 202 is driven with power stored in the battery 201 serving as an electric power source and rotates the wheels 203. On the other hand, the electric motor 202 decelerates by deceleration of the wheels 203, and performs charging into the battery 201 (for example, charging by regenerative operation of the electric motor 202). In this way, electric energy contributing to charging into the battery is referred to as regenerative energy.

However, unlike Patent Document 1, the regenerative energy referred to herein may include electric energy obtained at a downward slope by using an alternator (not illustrated) serving as a regenerative brake.

Further, the entire regenerative energy is not charged into the battery. In a state in which the battery is fully charged, even when the regenerative energy is generated, it is not charged to the battery.

The engine 204 is normally an internal combustion engine in a case where it is mounted on the vehicle, but may be an external combustion engine. The engine 204 is driven with combustion of a fuel serving as the power source to rotate the wheels 203. In a case where the present invention including this embodiment is applied to the electric motor vehicle, a consideration in which the engine 204 is omitted is employed.

The power management device 10 creates the travel control plan P which shows how to utilize the electric energy of the vehicle to cause the vehicle to travel. Details of the travel control plan P and creation thereof will be described below.

The current position sensor device 20 outputs current position information J which shows a current position of the vehicle. The current position, for example, may be an absolute position, such as latitude/longitude of a GPS, or may be a relative position which indicates a distance from a specific position.

The orientation sensor device 30 outputs traveling orientation information C which shows a traveling orientation of the vehicle. Regarding the traveling orientation, for example, true north is set to 0 degrees, east is 90 degrees, south is 180 degrees, and west is set to 270 degrees, so that the angles may be adopted as the traveling orientation information C.

The information providing device 50 notifies a driver of recommendation to turn off an accelerator on a display or by voice on the basis of accelerator-off recommendation information R.

The vehicle speed sensor device 60 outputs vehicle speed information Vd which shows speed of the vehicle (vehicle speed). The vehicle speed information Vd, for example, may take a form of a pulse value which indicates the vehicle speed. It should be noted that the information providing device 50 may further notify current speed of the vehicle by obtaining the vehicle speed information Vd from the vehicle speed sensor device 60.

The accelerator sensor device 80 detects a stepping angle θacc of the accelerator. The accelerator may be grasped as a mechanism for accelerating the vehicle. By grasping in this way, stepping-on of the accelerator by the driver corresponds to operation of the mechanism. Since a technique for controlling the electric motor 202 and the engine 204 by the accelerator is known, details of the technique are omitted.

The power management device 10 includes a travel control planning unit 1, a section valid road slope information storage unit 2, a nonvolatile information storage unit 3, and a drive assist information output unit 4.

The travel control planning unit 1 inputs the current position information J and the traveling orientation information C. In a case where section valid road slope information Q corresponding to these is obtained, the travel control planning unit 1 creates the travel control plan P, which will be described below in detail, and outputs this.

The section valid road slope information storage unit 2 functions as an information storage unit for storing section road slope information which becomes a candidate for the section valid road slope information Q.

The nonvolatile information storage unit 3 stores the current position information J and the travel control plan P.

The drive assist information output unit 4 creates the accelerator-off recommendation information R and outputs this to the information providing device 50.

<Operation of Power Management System 100A>

Next, description about operation of the power management system 100A will be given using FIGS. 2 to 6 while referring to FIG. 1.

<Basic Processing Flow of Power Management Device 10>

Figure 2:
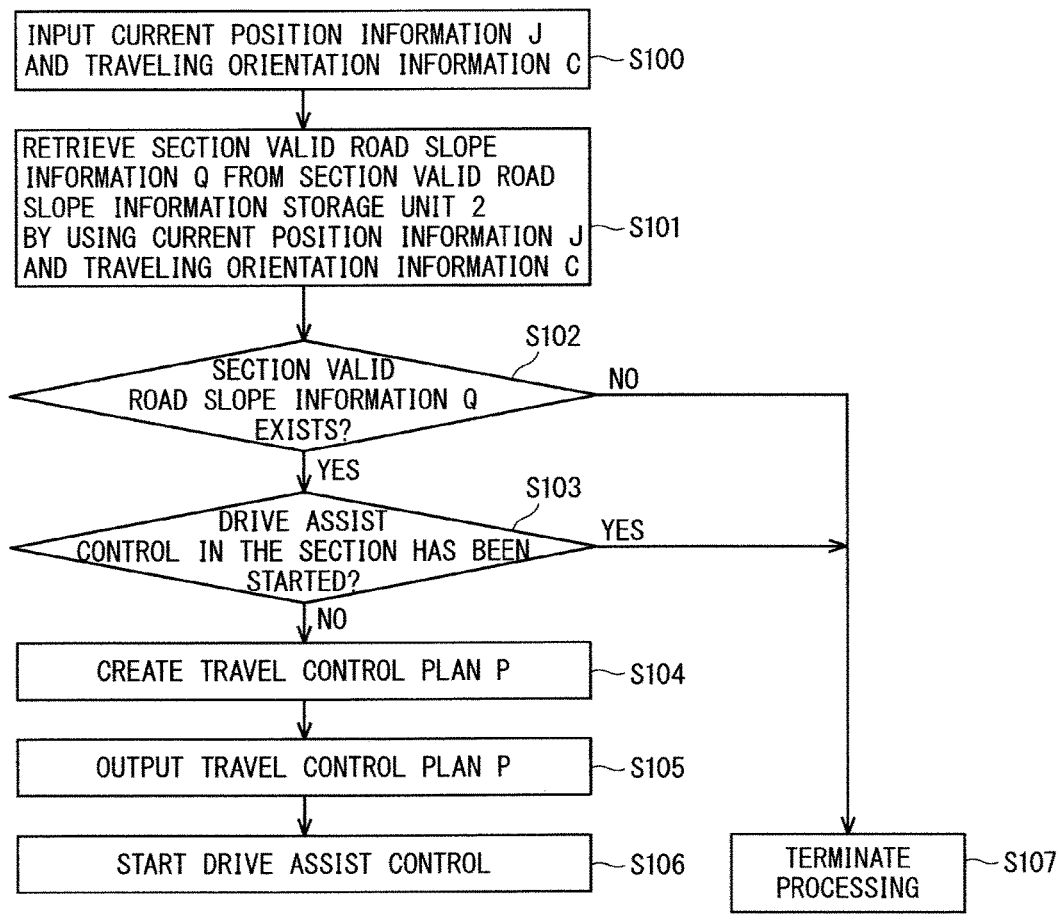
FIG. 2 is a flowchart describing processing in which a travel control planning unit creates a travel control plan in the embodiment 1.

FIG. 2 is a flowchart describing processing in which the travel control planning unit 1 creates and outputs the travel control plan P in the power management device 10.

First, the current position sensor device 20 and the orientation sensor device 30 respectively input the current position information J of a vehicle and the traveling orientation information C of the vehicle to the power management device 10 (a step S100). For example, by turning on an ignition key (not illustrated) of the vehicle, a power supply of an electric system of the vehicle is turned on. Accordingly, the power management system 100A starts operation, and the step S100 is executed.

It should be noted that, if the current position information J and the traveling orientation information C are information of contents capable of respectively discriminating the position and the traveling orientation of the vehicle, they are not restricted to expression forms of the latitude/longitude of the GPS, the angle from true north, and the like. Further, if a position acquisition interval of the vehicle can be obtained with a certain accuracy (for example, within 100 meters), such as in a case where the vehicle is moved by a fixed distance, timing of inputting the current position information J and the traveling orientation information C to the power management device 10 may not be periodic timing for every fixed time.

Next, the travel control planning unit 1 retrieves the section valid road slope information Q from the section valid road slope information storage unit 2 by using the current position information J and the traveling orientation information C, which have been acquired (a step S102).

However, section road slope information capable of being the section valid road slope information Q which corresponds to the current position information J and the traveling orientation information C is not always stored in the section valid road slope information storage unit 2. This will be described below in detail.

Table 1 shows a data storage example of the section road slope information in the section valid road slope information storage unit 2.

TABLE 1

| | | | | | Road Slope Information | | | | | |
| | | | | | Section | Upward Slope | | | Downward Slope | | |
| Index | GPS LATITUDE | GPS LONGITUDE | Traveling Orientation | Route Distance | Start Position | End Position | Road Slope | Start Position | End Position | Road Slope |
| --- | --- | --- | --- | --- | --- | --- | --- | --- | --- | --- |
| ID1 | 34° A' B" | 135° C' D" | 0° | 800 m | 100 m | 300 m | 6% | 500 m | 700 m | 4% |
| ID2 | 34° A' B" | 135° C' D" | 90° | 1000 m | 200 m | 400 m | 5% | 600 m | 900 m | 5% |
| ID3 | 34° A' B" | 135° C' D" | 270° | 2000 m | 300 m | 500 m | 7% | 700 m | 1000 m | 8% |

Figure 3:
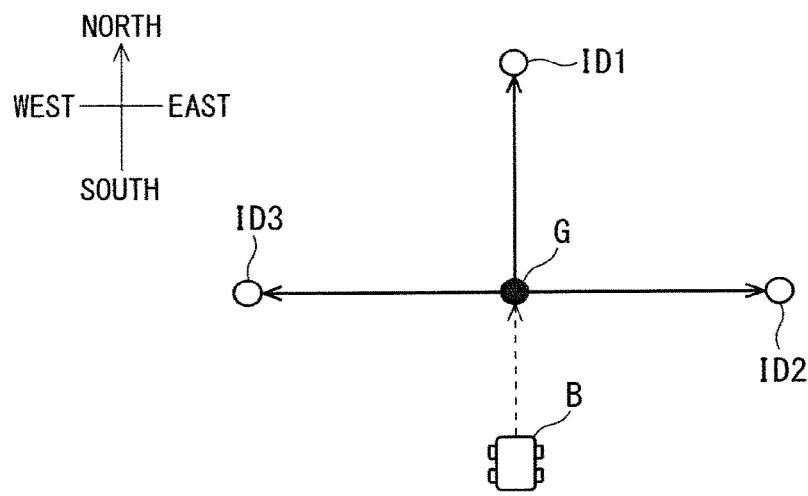
FIG. 3 is a map explaining section road slope information.

FIG. 3 is a map explaining the section road slope information illustrated in Table 1. The section road slope information has position coordinates with a cardinal point G in the current position information J of a vehicle B and road slope information corresponding to a traveling orientation from the cardinal point G.

Specifically, the travel control planning unit 1 retrieves the road slope information corresponding to the cardinal point. The cardinal point is shown by GPS latitude/longitude which can be regarded as the same point or a predetermined position in the same road (such as before a predetermined intersection) as the current position information J.

The GPS latitude/longitude which can be regarded as the same, for example, indicates GPS latitude/longitude in which an error from the current position information J input from the current position sensor device 20 is within 10 to 15 meters in consideration of a positioning error of the GPS.

In a city area having high-rise buildings or the like, it is also possible that positioning of the GPS by the current position sensor device 20 cannot be performed for every fixed time. In such a case, the present position may be virtually obtained with a previously positioned GPS coordinate position (latitude/longitude) as the cardinal point, by using the traveling orientation information C input from the orientation sensor device 30 and the vehicle speed information Vd obtained from the vehicle speed sensor device 60, and by using an existing position identification method, such as Dead Reckoning.

In Table 1, a road section with the cardinal point G as a starting point and a destination as an end point is shown. The GPS latitude and the GPS longitude of the cardinal point G are set to 34 degrees A minutes B seconds and 135 degrees C. minutes D seconds, respectively. The road slope information is stored in association with the road section.

A destination indicated by an index ID1 (hereinafter, also referred to as "Destination ID1") is located in the true north of the cardinal point G, and the traveling orientation from the cardinal point G is 0 degrees. A destination indicated by an index ID2 is located in the true east of the cardinal point G, and the traveling orientation from the cardinal point G is 90 degrees. A destination indicated by an index ID3 is located in the true west of the cardinal point G, and the traveling orientation from the cardinal point G is 270 degrees.

In addition to the index, the GPS latitude and the GPS longitude of the cardinal point G, and the traveling orientation, the section valid road slope information Q also has the following road slope information.

The road slope information at least includes an entire distance of the section expressed by a route distance (a section route distance), start/end positions of an upward slope and/or a downward slope, and each road slope (%) thereof. Here, the route distance is a distance of a route with the cardinal point G serving as an origin. The information which shows the upward slope/the downward slope may be plural in the same road section.

Figure 4:
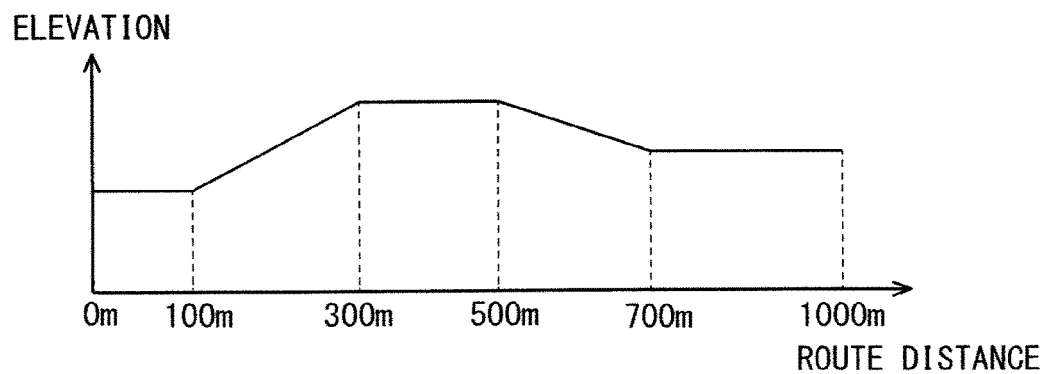
FIG. 4 is a graph illustrating a relationship between an elevation and a route distance of a road section.

By using a road section from the cardinal point G to the destination ID1 as an example, the road slope information is described. The route distance in the road section is 800 m, and a section which serves as the upward slope and a section which serves as the downward slope are included therein. The section which serves as the upward slope starts at a position of 100 m along a route from the cardinal point G and ends at a position of 300 m along the route from the cardinal point G. The road slope of the section is 6%. The section which serves as the downward slope starts at a position of 500 m along the route from the cardinal point G and ends at a position of 700 m along the route from the cardinal point G. (An absolute value of) the road slope of the section is 4%. FIG. 4 is a graph illustrating a relationship between an elevation and a route distance of these road sections.

Returning to FIG. 2, in the step S102, in a case where the section valid road slope information Q is successfully extracted, it is determined whether or not drive assist control (for example, processing of the drive assist information output unit 4 for performing notification of the aforementioned accelerator-off recommendation information R) has been started in the road section (a step S103). In a case where the drive assist control has not been started, the travel control plan P is created (a step S104).

In a step S105, the created travel control plan P is output to the drive assist information output unit 4 and the travel control device 40. In a step S106, the drive assist information output unit 4 starts the drive assist control on the basis of the travel control plan P.

It should be noted that, in a case where the section valid road slope information Q cannot be extracted in the step S102 or the drive assist control has been started in the road section in the step S103, the processing is terminated (a step S107).

A reason for confirming in the step S103 whether or not the drive assist control has already been started in the same road section shown by the retrieved section valid road slope information Q is described. Assuming that input of the current position information J and the traveling orientation information C is performed for every fixed time, the same section valid road slope information Q can be continuously retrieved in the step S102 during stoppage of the vehicle.

The reason is that in the road section where the travel control plan P is once created and the drive assist control has been started, the same drive assist control will not be started until the vehicle passes through the road section or enters the other road section.

Also, in order to avoid the continuous retrieval of the same section valid road slope information Q as mentioned above, the step S103 is provided.

It should be noted that determination of whether the road section shown by the section valid road slope information Q retrieved in the step S102 is the same as the road section during the drive assist control can be performed, for example, by using an identifier of the section valid road slope information Q (for example, the index in Table 1).

It should be noted that a non-rewritable medium, such as an ROM (Read Only Memory) or a rewritable recording medium, such as a Flash memory, can be employed for the section valid road slope information storage unit 2.

<Creation and Output of Travel Control Plan P in Travel Control Planning Unit 1>

Figure 5:
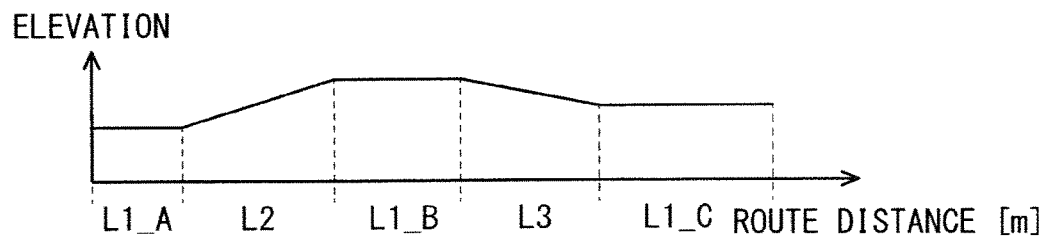
FIG. 5 is a graph illustrating a relationship between an elevation and a route distance of a road section.
Figure 6:
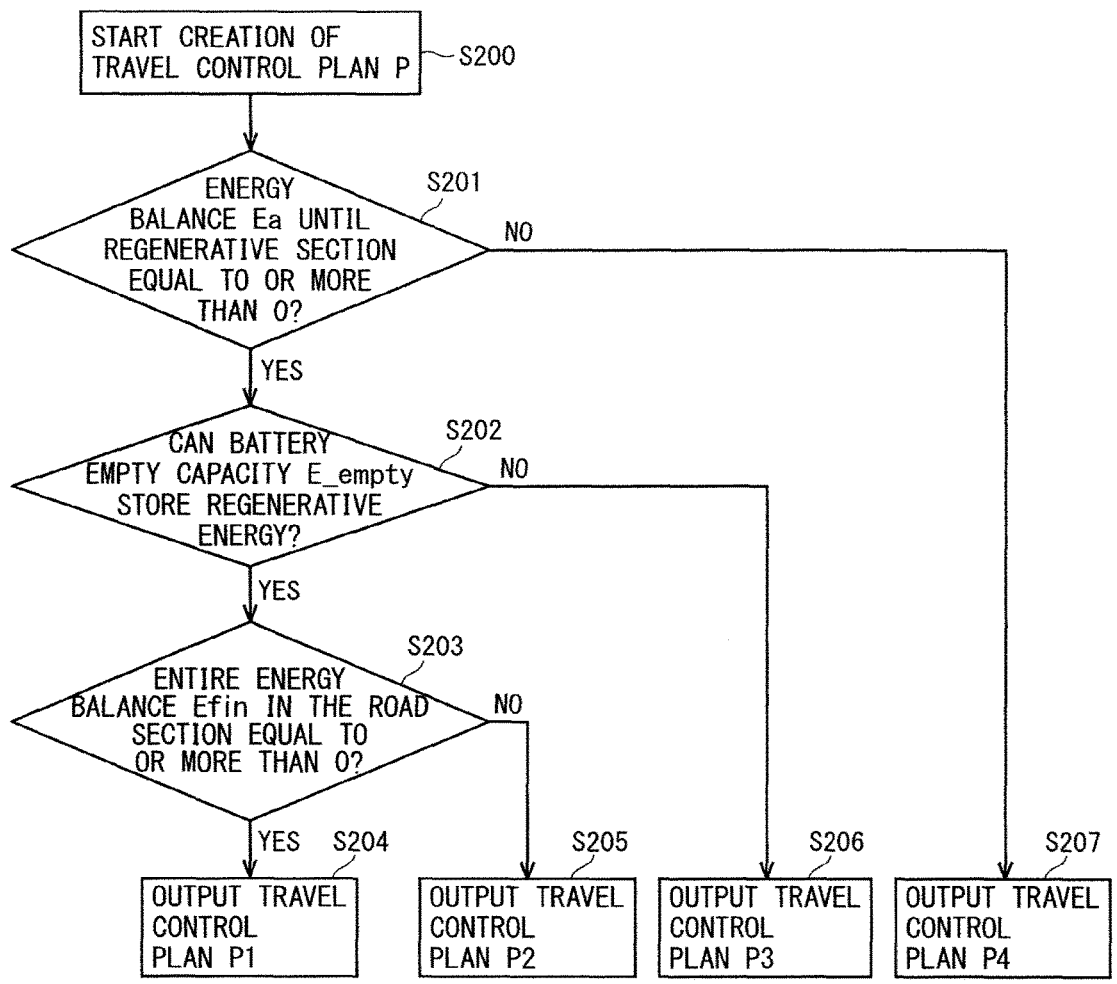
FIG. 6 is a flowchart illustrating processing of the travel control planning unit.
Figure 7:
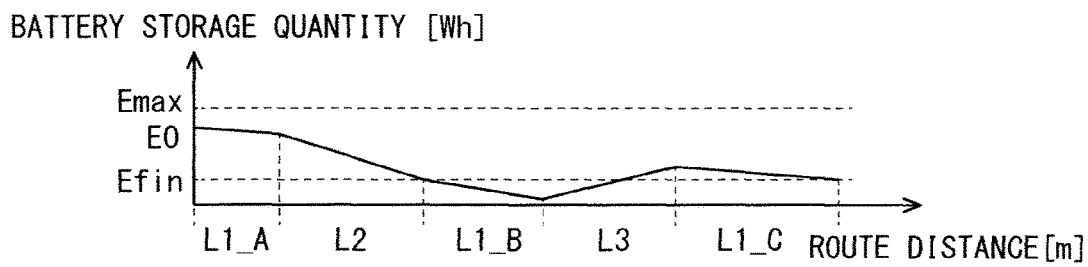
FIG. 7 is a graph illustrating a relationship between a battery storage quantity and a route distance.

Next, a concrete explanation using FIG. 5, FIG. 6, and FIG. 7 will be performed about how the travel control plan P is created and output by the travel control planning unit 1 (see the steps S104, S105 in FIG. 2).

For ease of explanation, the battery storage quantity SOC is input to the power management device 10 from the battery sensor device 70 for every fixed time. Also, the travel control planning unit 1 is capable of referring to a value of the input battery storage quantity SOC. In FIG. 1, such reference is shown by directing an arrow which indicates the battery storage quantity SOC toward the travel control planning unit 1.

Further, electric energy or regenerative energy consumed by the road slope is obtained from the road slope and the travel distance at the road slope.

Similarly, in a flat road section having no road slope, electric energy consumed in the flat road section is obtained from the traveling speed and the distance in the flat road section.

Energy consumed in traveling a unit distance (for example, 1 m: the same hereinafter) of the flat road section is converted to watt-hour to obtain E1 [Wh/m]. An electric energy quantity E1 depends on a traveling speed V of the vehicle (a unit thereof, for example, is [km/h]).

For the traveling speed V, for example, an average value of the vehicle speed (the traveling speed of the vehicle B) when the vehicle enters the road section is employed. For example, the vehicle speed sensor device 60 inputs the vehicle speed information Vd at that point of time to the travel control planning unit 1 for every fixed time (for example, every ten milliseconds). The travel control planning unit 1 calculates, from the vehicle speed information Vd, an average traveling speed Va serving as an average value of the vehicle speed per predetermined time (for example, three minutes). This average traveling speed Va can be employed for the traveling speed V.

Table 2 is a table illustrating a relationship between the electric energy quantity E1 [Wh/m] and the traveling speed V.

TABLE 2

| Traveling Speed V [Km/h] | E1 [Wh/m] |
|---|---|
| 0 | 0 |
| 10 | 100 |
| 20 | 150 |
| 30 | 250 |
| 40 | 400 |
| 50 | 600 |
| 60 | 800 |
| 70 | 1000 |
| 80 | 1500 |

Energy consumed in traveling a unit distance of an upward slope section is converted to watt-hour to obtain E2 [Wh/m]. An electric energy quantity E2 depends on a road slope α [%] serving as a magnitude of the upward slope. Energy contributed to charging into the battery when the vehicle travels a unit distance of a downward slope section is converted to watt-hour to obtain E3 [Wh/m]. An electric energy quantity E3 depends on a road slope β [%] serving as an absolute value of a magnitude of the downward slope.

The electric energy quantities E2, E3 are values including energy quantities consumed by air resistance and road surface friction in a case where the average traveling speed in each of the upward slope section and the downward slope section is assumed.

At the road slope having large consumption energy or regenerative energy, the traveling speed is designed to be a predetermined value or lower. For example, in Japan, a design speed for every longitudinal slope of a roadway is determined in Article 20 of Government Order on Road Design Standards. Similar stipulations are made in other countries as well.

Accordingly, the speed designed in this way is assumed as the average traveling speed in the upward slope section and the downward slope section, and values of the electric energy quantities E2, E3 should be given. In other words, actual speed when the vehicle travels in the upward slope section or the downward slope section does not affect the electric energy quantity E2, E3.

Further, the road surface friction can be also treated as a value of a paved road surface by eliminating a rare condition, such as road surface freezing or a gravel road, at the upward/downward road slope.

Further, it is desirable that a value obtained by reflecting performance of the vehicle, such as an upper limit or a lower limit of regenerative brake power or charging efficiency of the battery (power stored in the battery÷power input to the battery), be set to the electric energy quantity E3.

Accordingly, the electric energy quantities E2, E3 [Wh/m] depend on the road slopes α, β, and, for example, have a relationship illustrated in Table 3.

TABLE 3

| Road Slope [%] (α or β) | E2 [Wh/m] | E3 [Wh/m] |
|---|---|---|
| 0 (Flat Road) | 100 | 50 |
| 1 | 100 | 50 |
| 2 | 250 | 120 |
| 3 | 500 | 300 |
| 4 | 1000 | 600 |
| 5 | 1800 | 1000 |

It should be noted that, in the downward slope section, when the absolute value of the road slope is large, there is a case where a regenerative energy quantity which can be recovered by the regenerative brake exceeds a regenerative energy quantity generated by an actual difference in elevation. In this case, the electric energy quantity E3 becomes a maximum power generation quantity of the regenerative brake.

Conversely, in a case where the road slope β which is necessary to obtain the regenerative energy with a predetermined value E3x or more is X [%] or more, a value of E3 [Wh/m] in Table 3 is given only to the road slope β with X [%] or more.

In other words, in the section road slope information shown in Table 3, in a case where the road section has the downward slope section, only the one which includes the downward slope section (hereinafter also referred to as a "regenerative section") whose road slope β is X [%] or more is stored in the section valid road slope information storage unit 2. In other words, (a) the section valid road slope information storage unit 2 stores the road slope information including the information about the slope of the road section in which the vehicle travels in association with the road section, and (b) one of the road slope information which shows the downward slope in the traveling of the vehicle has the slope steeper than a predetermined slope depending on the vehicle.

It should be noted that the same applies to the upward slope and that a value of the electric energy quantity E2 [Wh/m] is given only to the road slope Y [%] with a predetermined value E2x or more. In other words, in a case where the road section has the upward slope section, only the section road slope information which includes the upward slope section whose road slope α is Y [%] or more is stored in the section valid road slope information storage unit 2.

Values determined in advance by experiments or calculations by using vehicle characteristics of the vehicle, for example, a car weight or performance of the regenerative brake (maximum torque or minimum torque), are applied to the predetermined values E3x, E2x, and eventually "the predetermined slope" mentioned in the above-described (b). For example, a car weight of a motor vehicle serving as the vehicle will be described below in detail.

Figure 13:
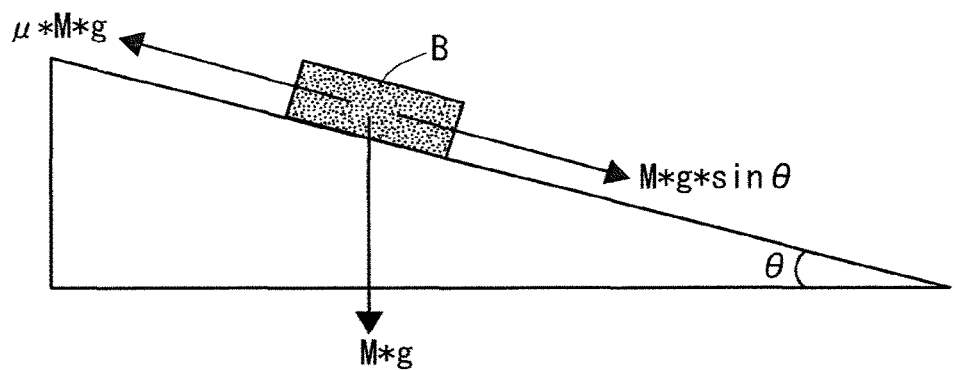
FIG. 13 is a schematic view illustrating forces exerted on a vehicle at a downward slope.

FIG. 13 is a schematic view illustrating forces exerted on the vehicle at the downward slope. At the downward slope of an inclination angle θ, forces exerted on the vehicle B having a car weight M are examined. By introducing a gravitational accelerator g, a rolling friction coefficient t, and a minimum driving force H for driving in regeneration, a condition in which the regenerative energy is obtained at the downward slope is expressed in a formula (1), wherein a symbol "*" indicates a multiplication operator, and 0≤θ≤90°.

[Formula 1]

$$M*(\sin θ - μ*\cos θ)*g > H \quad (1)$$

A left-hand side of the formula (1) shows a force that can be used for driving for advancing the vehicle B downwardly. The car weight M and the minimum driving force H are different according to the vehicle. Hence, a range of the inclination angle θ for satisfying the formula (1) is also different depending on the car weight M and the minimum driving force H.

For example, a car weight M of a light motor vehicle is about 600 to 800 kg, and a car weight of an ordinary motor vehicle is about 1300 to 1600 kg. Hence, when the light motor vehicle is compared with the ordinary motor vehicle, a value of the inclination angle θ for satisfying the formula (1) is larger.

Because of this, the light motor vehicle cannot be expected to recover the regenerative energy of a predetermined value or more at a gentle downward road slope of 2 to 3%. Accordingly, by assuming that it is sufficient if the road slope data of only the downward road slope with the road slope of 5% or more is stored, the necessary road slope data quantity is reduced.

The same applies to the upward slope, and it is possible to reduce the road slope data.

More specifically, throughout Japan, when the data of only the road slope with the value of the downward slope corresponding to the inclination angle θ being 5% or more is assumed, a total quantity of the data is a data quantity of about two to three megabytes. Further, when the data of only the road slope with the road slope being 8% or more is assumed, a total quantity of the data is a data quantity of about 100 kilobytes. These data quantities, as mentioned above, are derived from regulations on the values of the road slope according to limiting speed (upper limits: regulated by Government Order on Road Design Standards in Japan).

The larger the "predetermined slope" of the road slope serving as a threshold value of whether or not it is stored in the section valid road slope information storage unit 2, the smaller the data to be held. With this configuration, calculation of the regenerative energy can be performed by a device, such as a one-chip microcomputer. Such technique is desirable from a viewpoint of matching a cost of the light motor vehicle which is less expensive than the ordinary motor vehicle, and specifically, from a point of obtaining a motor vehicle which matches with needs to realize reduction of the energy without increasing a cost for an on-vehicle electric component.

Conversely, a higher cost can be borne by the ordinary motor vehicle than the light motor vehicle by holding data in a device, such as a car navigation system equipped as a standard, or the like. However, it costs accordingly to hold gigabyte-level data.

However, as with the present embodiment, if the data quantity of the road slope is small and a storage quantity of two to three megabytes is added to the existing system, an effect which is equivalent or closer to a case of holding the entire road slope data is obtained in regenerative energy calculation. This is because the road slope data which does not satisfy the above-described formula (1), that is, which is not capable of obtaining the regenerative energy, accounts for seventy to eighty percent of the entire road slope data throughout Japan. In other words, in the energy calculation, the impractical data accounts for seventy to eighty percent of the entire road slope data throughout Japan.

Hereinafter, a case where one upward slope section with a route distance L2, one downward slope section with a route distance L3, and at least one flat road section with a sum of travel distances being a route distance L1 are included in a certain road section is assumed.

FIG. 5 is a graph corresponding to the road section shown in FIG. 4, and illustrating a relationship between an elevation and a route distance. This road section has a flat road section with a route distance L1_A, the upward slope section with the route distance L2, a flat road section with a route distance L1_B, the downward slope section with the route distance L3, and a flat road section with a route distance L1_C, from the cardinal point G to the destination ID1 in that order.

The section route distance L in this road section is a sum of the route distances L1_A, L2, L1_B, L3, and L1_C.

An energy balance in the road section will be described below. An electric energy quantity E0 [Wh] serving as a battery residual quantity at the cardinal point G is obtained from the battery storage quantity SOC input from the battery sensor device 70 at a point of time when the travel control plan P is created. The energy balance in a case where the vehicle travels in the road section only by the electric energy (the EV mode) is expressed as the electric energy quantity E [Wh] serving as the battery residual quantity in the following formula (2).

[Formula 2]

$$E = E0 - (E1*L1) - (E2*L2) + E3*L3 \quad (2)$$

wherein, L1=L1_A+L1_B+L1_C

Therefore, in the examination of only the energy balance, it can be assumed that, if E>0, the vehicle B can travel in the road section only in the EV mode.

<Creation Flow of Travel Control Plan P>

In this way, in order that the vehicle B reliably travels in the road section only in the EV mode and the entire regenerative energy is recovered by the battery 201, it is necessary to satisfy both of two conditions:
(i) the residual quantity of the battery 201 is 0 or more until the vehicle B arrives in the regenerative section (in other words, the vehicle B can travel until arriving at the regenerative section by the power stored in the battery 201); and
(ii) an empty capacity E_empty of the battery 201 when the vehicle B arrives in the regenerative section is larger than a total quantity of the regenerative energy estimated to obtain in the regenerative section (in other words, the battery 201 can recover the entire electric energy contributed to the charging of the battery 201 in the regenerative section).

FIG. 6 is a flowchart illustrating processing of the travel control planning unit 1. In a case where a determination result in the step S103 (see FIG. 2) is negative (in other words, a case where the drive assist control in the section is not started), creation of the travel control plan P is started in a step S200.

In a step S201, it is determined whether or not the above-described condition (i) is satisfied. Specifically, if an energy balance Ea obtained in the formula (3) is 0 or more, it is clear that the above-described (i) is satisfied.

[Formula 3]

$$Ea = E0 - E1*(L1\_A + L1\_B) - (E2*L2) \geq 0 \qquad (3)$$

If a determination result in the step S201 is true (YES), it is determined whether or not the above-described condition (ii) is satisfied in a step S202. The empty capacity E_empty is obtained in a right-hand side of an equality (a left-hand side of an inequality) of a formula (4) by introducing a maximum storage quantity E max [Wh] of the battery 201. Since the total quantity of regenerative energy estimated to obtain in the regenerative section is expressed as E3*L3, truth/falsehood in the step 202 are respectively determined by validity/invalidity of the inequality with an equality sign in the formula (4).

[Formula 4]

$$E\_empty = E\,\max - Ea \geq E3*L3 \qquad (4)$$

If a determination result in the step S202 is true (YES), entire charging energy generated in the regenerative section can be recovered by the battery 201. In this case, a determination in a step S203 is further performed. In the step S203, it is determined whether or not an entire energy balance Efin in the road section is 0 or more (in other words, the vehicle B can travel in this road section by the power stored in the battery 201). The energy balance Efin is obtained according to an equality of a formula (5) by considering the aforementioned electric energy quantity E. In other words, truth/falsehood in the step S203 are respectively determined by validity/invalidity of an inequality with an equality sign in the formula (5).

[Formula 5]

$$Efin = E0 - E1*(L1\_A + L1\_B + L1\_C) - (E2*L2) + E3*L3 \geq 0 \qquad (5)$$

FIG. 7 is a graph illustrating a relationship between a battery storage quantity and a route distance in a case where the determination result in the step S203 is true (YES). The battery storage quantity when the vehicle arrives (see a left end of a downward slope section shown by a sign L3) in the regenerative section (see the sign L3) is positive, and the condition (i) is satisfied. Further, the battery storage quantity in the regenerative section is less than the maximum storage quantity E max, and the condition (ii) is satisfied. Moreover, the battery storage quantity when the vehicle arrives at an end point of the road section (see a right end of a flat road section shown by a sign L1_C) is positive, and it is also shown that the energy balance Efin is 0 or more.

Incidentally, in a case where the determination result in the step S203 is true (YES), the travel control planning unit 1 generates and outputs a travel control plan P1 in a step S204. In a case where the determination result in the step S203 is false (NO), the travel control planning unit 1 generates and outputs a travel control plan P2 in a step S205. In a case where the determination result in the step S202 is false (NO), the travel control planning unit 1 generates and outputs a travel control plan P3 in a step S207. In a case where the determination result in the step S201 is false (NO), the travel control planning unit 1 generates and outputs a travel control plan P4 in the step S206.

The travel control plan P is a generic term for these travel control plans P1 to P4. An output destination of the travel control plan P is the drive assist information output unit 4 and the travel control device 40. Processing of the drive assist information output unit 4 and the travel control device 40 based on the travel control plan P will be described below.

<Travel Control Plan P1>

When the determination result in the step S203 is true (YES), it is assumed that the vehicle B can travel in the road section only in the EV mode. Hence, information which shows that the vehicle B can travel only in the EV mode, the storage quantity of the battery at a point of time when the traveling in the road section is completed (this can be also grasped as the energy balance Efin), and the section route distance L of the road section are included in the travel control plan P1.

<Travel Control Plan P2>

An electric energy quantity Er which becomes insufficient in a case where the vehicle B travels in the road section only in the EV mode, and the section route distance L are included in the travel control plan P2.

<Travel Control Plan P3>

A route distance Lg up to a start position of the regenerative section (this is a sum of the route distances L1_A, L2, and L1_B on the basis of FIG. 5), a regenerative energy quantity Eg which can be recovered in the regenerative section (this can be grasped as E3*L3 in the formula (3)), and the section route distance L are included in the travel control plan P3.

<Travel Control Plan P4>

An electric energy quantity Erg [Wh] which becomes insufficient since the vehicle B travels up to the start position of the regenerative section only in the EV mode (this is substantially equal to an absolute value of the energy balance Ea in the formula (2)), the regenerative energy quantity Eg which can be recovered in the regenerative section, and the section route distance L are included in the travel control plan P4.

<Operation of Travel Control Device 40>

The travel control device 40 performs travel control on the basis of the travel control plan P received from the power management device 10 (more specifically, from the travel control planning unit 1) so as to minimize an energy quantity consumed in the road section.

<Processing Based on Travel Control Plan P1>

Description will be given about a case where the travel control plan P received from the power management device 10 by the travel control device 40 is the travel control plan P1.

The travel control plan P1, as mentioned above, includes the information which shows that the vehicle B can travel only in the EV mode, the energy balance Efin [Wh], and the section route distance L [m]. The travel control device 40 calculates an electricity expense DpE of the road section (a distance capable of traveling per unit power: a unit thereof herein is [m/Wh]) on the basis of a formula (6).

[Formula 6]

$$DpE = L/(E0 - Efin) \qquad (6)$$

Here, in order that the travel control device 40 recognizes the electric energy quantity E0 [Wh] serving as the battery residual quantity at the cardinal point G, the battery storage quantity SOC is input from the battery sensor device 70 to the travel control device 40.

In a case where the electricity expense DpE is a predetermined value DpEz or more, or in a case where the section route distance L [m] in which the vehicle B can travel only in the EV mode is a predetermined value Lz [m] or more, the travel control device 40 performs the travel control for traveling in the EV mode. Values previously obtained from experiments or the like can be utilized for such predetermined values DpEz, Lz.

<Processing Based on Travel Control Plan P2>

Description will be given about a case where the travel control plan P received from the power management device 10 by the travel control device 40 is the travel control plan P2.

The travel control plan P2, as mentioned above, includes the insufficient electric energy quantity Er. In timing having good power generation efficiency in the road section, the travel control device 40 secures the power with the electric energy quantity Er or more in the HV mode. In the other road sections, the travel control which employs the EV mode is performed.

<Processing Based on Travel Control Plan P3>

Description will be given about a case where the travel control plan P received from the power management device 10 by the travel control device 40 is the travel control plan P3.

The travel control plan P3, as mentioned above, includes the route distance Lg and the regenerative energy quantity Eg. Before the vehicle B arrives in the regenerative section, the travel control device 40 performs travel control for securing the battery empty capacity E_empty capable of charging the regenerative energy quantity Eg. For this purpose, in the travel control, the EV mode is employed in at least a part of a period before arriving in the regenerative section. In the regenerative section, the travel control which employs the EV mode is performed.

<Processing Based on Travel Control Plan P4>

Description will be given about a case where the travel control plan P received from the power management device 10 by the travel control device 40 is the travel control plan P4.

The travel control plan P4, as mentioned above, includes the insufficient electric energy quantity Erg and the regenerative energy quantity Eg. Since the vehicle B travels in the HV mode before arriving in the regenerative section, the travel control device 40 performs travel control for power-generating the electric energy quantity Erg in just proportion. In the regenerative section, the travel control employing the EV mode is performed. With this configuration, when the vehicle B travels in the road section, consumption of fuel is reduced.

<Operation of Drive Assist Information Output Unit 4>

Figure 8:
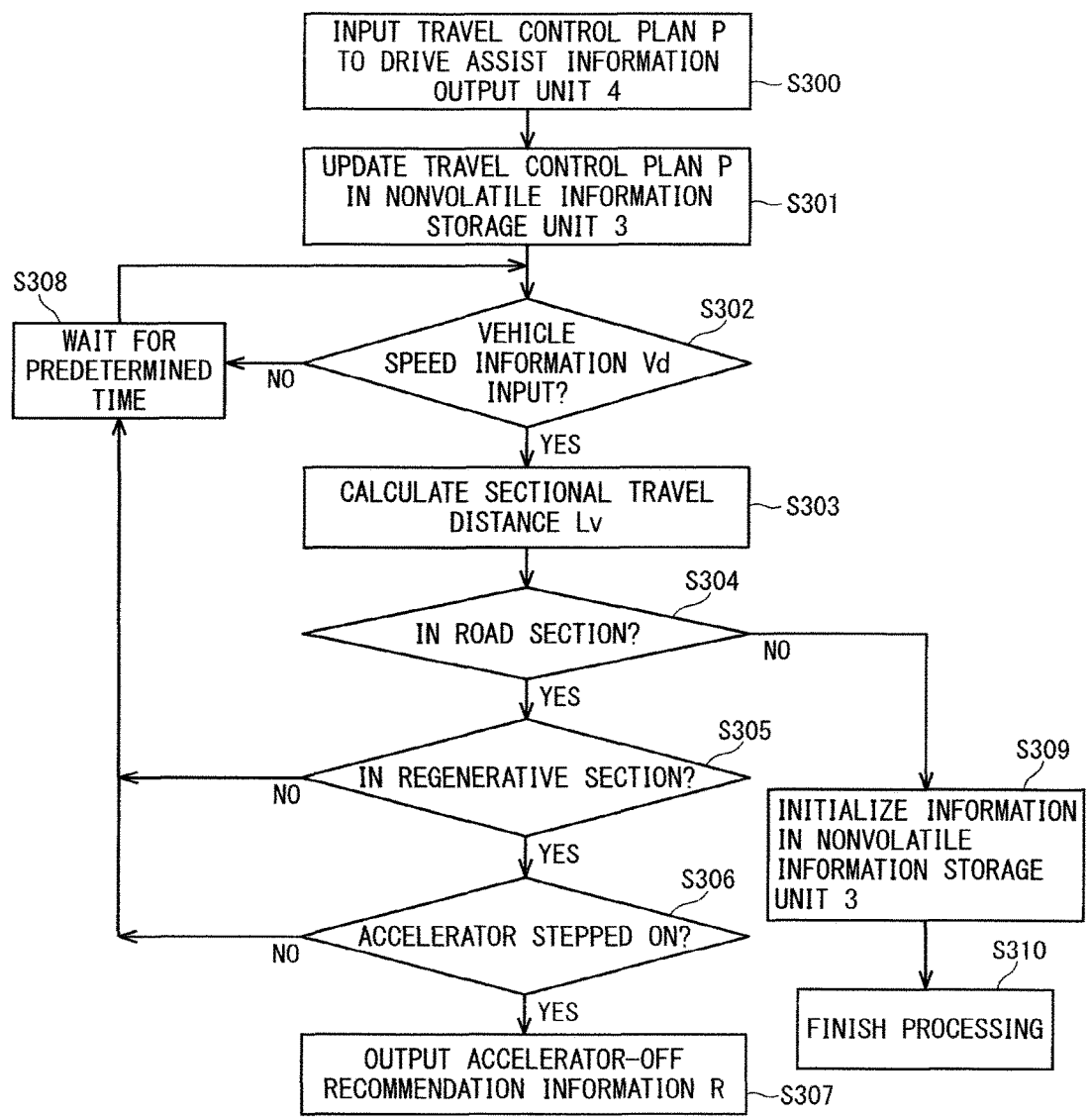
FIG. 8 is a flowchart illustrating processing of drive assist control of a drive assist information output unit in the embodiment 1.

FIG. 8 is a flowchart illustrating processing of the drive assist control of the drive assist information output unit 4, and illustrates operation after the step S106 in FIG. 2.

The drive assist control by the power management device 10 is started when any of the travel control plans P1, P2, P3, P4 output from the travel control planning unit 1 is input to the drive assist information output unit 4 (a step S300).

By storing (overwriting) the input travel control plan P in a predetermined region of the nonvolatile information storage unit 3, the travel control plan P utilized by the drive assist information output unit 4 is updated (a step S301).

The drive assist information output unit 4 waits for the vehicle speed information Vd to be input from the vehicle speed sensor device 60 (steps S302, S308).

The vehicle speed information Vd shows a traveling speed V(t). Herein, a variable t (0 to n) represents a time lapse, and a predetermined time Tv (for example, ten milliseconds) serving as a unit for varying the variable t is introduced. A point of time when the variable t takes a value 0 is a point of time when the vehicle B is located at the cardinal point G. The predetermined time Tv is the same time as a period in which the vehicle speed information Vd is input from the vehicle speed sensor device 60. In other words, in the steps S302, S308, the vehicle speed information Vd is input to the drive assist information output unit 4 while updating the traveling speed V(t) at the predetermined time Tv.

The drive assist information output unit 4 calculates a travel distance in the road section (hereinafter referred to as a "sectional travel distance") Lv [m] according to the formula (7).

[Formula 7]

$$Lv = \sum_{t=0}^{t=n} \{V(t) * Tv\} \quad (7)$$

In order to reduce an integration error of the sectional travel distance Lv, it is desirable that the predetermined time Tv be a short time.

Next, determination of whether or not a position of the vehicle B is within the road section is performed (a step S304). Specifically, it is determined whether or not the sectional travel distance Lv is less than the section route distance L. In other words, in a case where a formula (8) is valid (is true), it is determined that the position of the vehicle B is within the road section.

[Formula 8]

$$Lv<L \quad (8)$$

If a determination result in the step S304 is true (YES), determination of whether or not the vehicle B is in the regenerative section is further performed (a step S305). Specifically, the determination becomes a determination of truth or falsehood of a formula (9) based on FIG. 5.

[Formula 9]

$$(L1\_A+L2+L1\_B)<Lv<(L1\_A+L2+L1\_B+L3) \quad (9)$$

The route distance is required to determine the truth or falsehood of the formula (9). Hence, the section valid road slope information Q retrieved in the steps S101, S102 (see FIG. 2) is given to the drive assist information output unit 4 from the travel control planning unit 1.

In a case where the formula (9) is true, that is, in a case where the vehicle B is in the regenerative section, consumption of the fuel is reduced by turning off of the accelerator of the vehicle B. Hence, in this case, the drive assist information output unit 4 determines whether or not the accelerator is stepped on by using the stepping angle θacc of the accelerator input from the accelerator sensor device 80 (a step S306). The determination is specifically determination of truth or falsehood of a formula (10).

[Formula 10]

$$θacc>0 \quad (10)$$

In a case where the formula (10) is true, that is, in a case where the accelerator is stepped on, the accelerator-off recommendation information R is output to the information providing device 50 (a step S307). The accelerator-off recommendation information R shows that the vehicle B is in the regenerative section where turning off of the accelerator is recommended.

In a case where the respective determinations in the step S302, the step S305, the step S306 are false (NO), the processing is waited until the next vehicle speed information Vd is input from the vehicle speed sensor device 60 (for example, for the aforementioned predetermined time Tv) (a step S308). After that, the processing returns to the step S302, and input of the vehicle speed information Vd is confirmed.

In a case where the formula (7) is false (NO) in the step S304, the travel control plan and the sectional travel distance Lv stored in the nonvolatile information storage unit 3 are initialized (a step S309), and the processing is finished (a step S310).

<Operation of Power Management Device 10 During Power Supply ON/OFF>

The travel control planning unit 1 successively stores the average traveling speed Va in the nonvolatile information storage unit 3. The drive assist information output unit 4 successively stores the sectional travel distance Lv in the nonvolatile information storage unit 3. These storages are not performed in a condition in which the power supply is turned off and the power management system 100A is not operated. The nonvolatile information storage unit 3 is, for example, a nonvolatile storage device like a flash memory, which does not lose the stored information even if the power supply is turned off.

Initial operation immediately after the power management system 100A is operated is considered. More specifically, the initial operation after the vehicle B travels on the basis of the travel control plan P, operation of the travel control is temporarily stopped, and the operation is resumed is considered.

In such initial operation, the travel control planning unit 1 refers to the nonvolatile information storage unit 3 to confirm whether the travel control plan P, the sectional travel distance Lv, and the average traveling speed Va are stored. In a case where these information items are stored, before turning on the power supply which becomes an opportunity for the initial operation, the travel control plan P and the sectional travel distance Lv in a state in which the power supply is turned on are stored. These are namely the travel control plan P and the sectional travel distance Lv before the vehicle B stops.

In a case where these information items are stored, the travel control planning unit 1 reads the travel control plan P and the sectional travel distance Lv which have been stored, from the nonvolatile information storage unit 3 and outputs these to the travel control device 40. Then, the travel control device 40 resumes the travel control on the basis of the sectional travel distance Lv and the travel control plan P stored in the nonvolatile information storage unit 3.

In a case where a value of the stored sectional travel distance Lv is notified to the drive assist information output unit 4, the value is employed as the sectional travel distance Lv, and in a case where it is not notified, the drive assist information output unit 4 employs a value 0 as the sectional travel distance Lv. This processing and the aforementioned step S301 (FIG. 8) can be executed together.

With such operation, during the drive assist control or the travel control, in a case where the vehicle B temporarily stops and restarts in a convenience store, a service area, or the like, it is possible to resume the drive assist control of the drive assist information output unit 4 and the travel control of the travel control device 40.

<Update Operation of Travel Control Plan P>

The travel control planning unit 1 continuously calculates the average traveling speed Va at a predetermined period. When the travel control device 40 executes the travel control, there can be a difference between a value of the average traveling speed Va used in the travel control plan P to be referred to in the travel control and a value of the average traveling speed Va newly obtained by calculation. In a case where this difference is a predetermined value Vt or more, the travel control planning unit 1 creates the travel control plan P again on the basis of the newly obtained value of the average traveling speed Va. It is because, as shown in Table 2, the value of the electric energy quantity E1 depends on the average traveling speed Va, and the determinations using the formulas (2) to (5) are also different.

The travel control planning unit 1 outputs the created new travel control plan P to the travel control device 40. The travel control planning unit 1 also updates (rewrites) the average traveling speed Va stored in the nonvolatile information storage unit 3 with the newly obtained average traveling speed Va.

A value previously obtained by experiments or the like is utilized for the predetermined value Vt. It is desirable that the predetermined value Vt be a value in a range which causes the travel control plan P to be different from the previously created travel control plan P by, for example, changing the value of the electric energy quantity E1 selected in Table 2.

In this way, since the travel control is updated by matching with an actual speed, an error between the travel control plan P and actual travel is corrected, and accuracy of the control is enhanced.

Effects of Embodiment 1

Recovery of the regenerative energy has an effect of reducing consumption of the energy derived from the fuel or the energy derived from the power stored in the storage battery. Meanwhile, as described above, the power management device 10 according to the embodiment 1 previously has the road slope information about the road section having the slope in accordance with the characteristics of the vehicle B (such as the car weight, or the maximum power generation quantity or the minimum power generation quantity of the regenerative brake). By doing in this way, it is not necessary for the device, such as the car navigation system mounted on the motor vehicle, or an information center to have the information of the road section where recovery of the regenerative energy cannot be expected, such as the flat road or the gentle road slope.

Hence, the information quantity required to calculate the regenerative energy becomes less, and the device for storing the information can be also an inexpensive device with a small capacity. Hence, the aforementioned technology is particularly suitable for cost matching in the light motor vehicle. Also, retrieval time for the necessary road slope information is reduced. Such time reduction is preferable from a point in which it can be also utilized for an application which requires calculation in a short time, such as safe driving assistance.

Further, the road slope information is stored in association with the road section, and includes the start position, the end position, and the slope of the regenerative section. Hence, it is possible to recognize the positions of the regenerative section or to calculate the regenerative energy quantity Eg recoverable in the regenerative section.

Further, for example, the value which considers the speed set in designing of the road is applied to the traveling speed of the vehicle in the road with the slope. With this configuration, in the road with the slope, the electric energy quantities E2, E3 consumed per unit distance can be defined depending on the slope. Hence, the energy calculation can be more simplified (four arithmetic operations). This realizes fast creation of the travel control plan in a long distance road section. This is desirable from a viewpoint of requiring low arithmetic capacity requested to the power management device 10.

Further, in this power management device 10, apart from the road having the slope, the electric energy quantity E1 consumed in traveling on the flat road is defined as the quantity depending on the vehicle speed. With this configuration, since the value of the electric energy quantity E1 is individually determined by using the average value of the actual traveling speed (the average traveling speed) in the road section, the highly accurate calculation is realized while the energy calculation is more simplified (the four arithmetic operations).

Further, in this power management device 10, whether the vehicle B can travel in the EV mode in the road section in an entering direction thereof and the battery residual quantity in a case where the vehicle travels only in the EV mode (the step S204, see the travel control plan P1), or the insufficient electric energy quantity Er due to traveling only in the EV mode in the road section and the section route distance L (the step S205, see the travel control plan P2) are output. Further, the insufficient electric energy quantity Erg due to traveling only in the EV mode up to the regenerative section, or the regenerative energy quantity Eg recoverable in the regenerative section (the steps S205, S207, see the travel control plans P3, P4) are output. With this configuration, in the road section where the vehicle B cannot travel only in the EV mode, a power generation plan in a case where the vehicle travels in the HV mode is easily created in the travel control device 40.

Further, in the power management device 10, in a case where the driver steps on the accelerator in the regenerative section, the accelerator-off recommendation information R is output from the drive assist information output unit 4. Since the road slope information is stored in association with the start position or the end position of the regenerative section, the power management device 10 urges the driver to turn off (not to step on) the accelerator via the information providing device 50 or the like. This contributes to improvement of efficiency in recovering the regenerative energy when the vehicle travels in the regenerative section.

Moreover, in the power management device 10, the travel control plan P or the average traveling speed Va are stored in the nonvolatile information storage unit 3. Then, the information is referred to when the power supply is turned on, and the necessary information is output to the drive assist information output unit 4 and the travel control device 40. With this configuration, it is possible to resume the drive assist control and the travel control temporarily interrupted due to stoppage of the vehicle or the like. Further, the average travel distance in the road section may be stored in the nonvolatile information storage unit 3.

Further, the travel control device 40 calculates the electricity expense DpE serving as the distance capable of traveling per unit power from the battery residual quantity (E0−Efin) in a case where the vehicle travels only in the EV mode and the section route distance L, which have been input from the power management device 10. Then, if the value of the electricity expense DpE is the predetermined value DpEz or more, or if the section route distance L capable of traveling only in the EV mode is the predetermined value Lz or more, the EV mode is employed in the road section. Hence, without performing complicated calculation, and even with a low-spec CPU (Central Processor Unit), selection of the travel mode with better energy efficiency can be realized at high speed.

It should be noted that, since there is no road slope in the flat road section, storage of the road slope information about the flat road section may be omitted. In this case, in the flat road section, the consumed electric energy can be obtained from the traveling speed and the travel distance.

Embodiment 2

Next, description of the power management device in an embodiment 2 according to the present invention will be performed. It should be noted that the configuration of the power management system 100A illustrated in FIG. 1 is also employed in the embodiment 2.

In the embodiment 1, the section road slope information stored in the section valid road slope information storage unit 2 specifies the road section by the traveling orientation from the position of the cardinal point G as in Table 1. However, when such a data configuration is employed, there is a problem in that a data quantity increases with an increase in the number of cardinal points.

In the embodiment 2, with respect to this problem, a method for reducing a data quantity of section road slope information stored in a section valid road slope information storage unit 2 while being capable of realizing energy calculation with the same degree of accuracy as the embodiment 1 is described.

Figure 9:
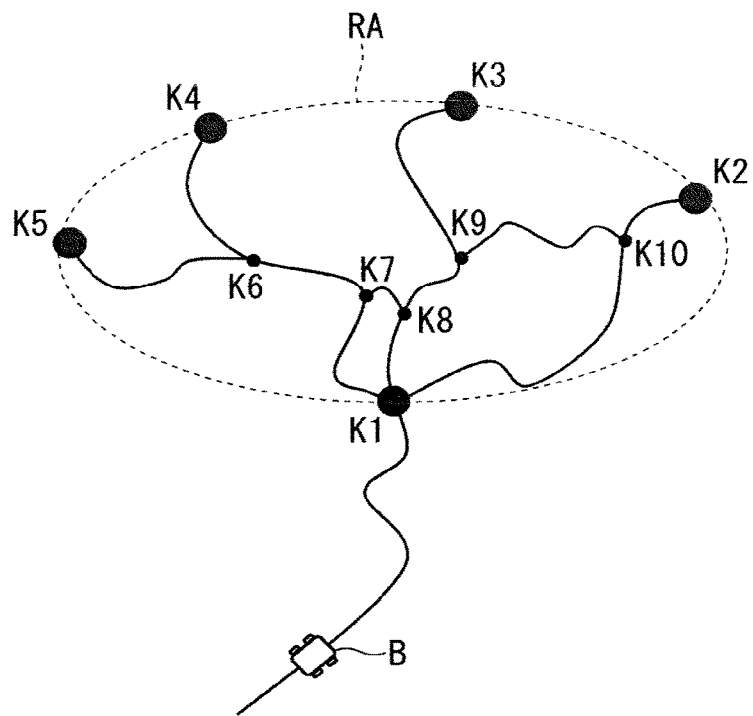
FIG. 9 is a map explaining section road slope information in an embodiment 2.

FIG. 9 is a map explaining section road slope information. The section road slope information is stored in the section valid road slope information storage unit 2 with end points K1, K2, K3, K4, K5 in a region RA where a vehicle can travel with a predetermined electric energy quantity Ec serving as cardinal points.

The end points K1, K2, K3, K4, K5 are connected by paths through relay points K6, K7, K8, K9, K10 via road sections. For example, the end points K1, K3 are connected by the path through the relay points K8, K9.

Table 4 shows a data storage example of the section road slope information stored by the section valid road slope information storage unit 2 in the embodiment 2. In Table 4, a plurality of road slope information items gathered by an index RA indicating the region RA is the one about the road section connecting any two points of the end points K1 to K5 in the region RA. For example, for the road slope information, the one which has passed through the relay points most efficiently in the road section is selected.

TABLE 4

| | | Road Slope Information | | |
|---|---|---|---|---|
| Index | Consumption Energy | Start Position | End Position | Road Slope (Negative Means Downward) |
| RA | Ec | 34° A' X" | 135° D' U''' | 5% |
| | | 34° B' Y" | 135° E' V''' | −6% |
| | | 34° C' Z" | 135° F' W''' | 4% |
| | | . | . | |
| | | . | . | |

A start position and an end position are GPS coordinates of any two different end points of the end points K1 to K5 in the region RA. However, the two end points corresponding to the start position and the end position shown in the same row are mutually connected by the road section, and a slope of the road section is shown in the same row (an upward slope is positive, a downward slope is negative, and a flat road is zero).

In this way, in the embodiment 2, the road slope information is stored and managed in a region unit (with respect to the region RA based on FIG. 9). Such data management has an advantage capable of reducing the stored data quantity, as compared with the data management (see Table 1) that individually stores the road slope information in the road section (indexes ID1, ID2, ID3 . . . in FIG. 3) as in the embodiment 1.

Electric energy quantities Ec consumed when a vehicle B travels from one of the end points K1 to K5 to another thereof are treated equal regardless of the end points. In other words, the region RA is treated as a region in which the electric energy quantities (herein the electric energy quantities Ec) consumed when the vehicle B travels between the end points located at a boundary of the region RA are equal. In other words, in the embodiment 2, the road slope information is associated with the plurality of road sections within the region RA where the energies consumed when the vehicle B travels are equal, and includes the start position, the end position, and the road slope of the road section.

The electric energy quantity Ec is an energy quantity corresponding to $\{-E1*(L1\_A+L1\_B+L1\_C)-(E2*L2)\}$ serving as a second term and a third term of a right-hand side of the equality (the left-hand side of the inequality) in the formula (5).

Hence, in the embodiment 2, the energy balance calculation calculated in the formula (5) in the embodiment 1 can be obtained by replacing the second term and the third term of the right-hand side of the equality with the electric energy quantity Ec. In other words, the calculation of the energy balance can be performed by using the region RA as a unit instead of using the road section as the unit.

In the embodiment 2 as well, regarding processing up to start of creation of a travel control plan P, except that what is retrieved in the steps S101, S102 in the flowchart in FIG. 2 is section road slope information in a region unit, the same processing as the embodiment 1 is performed.

Figure 10:
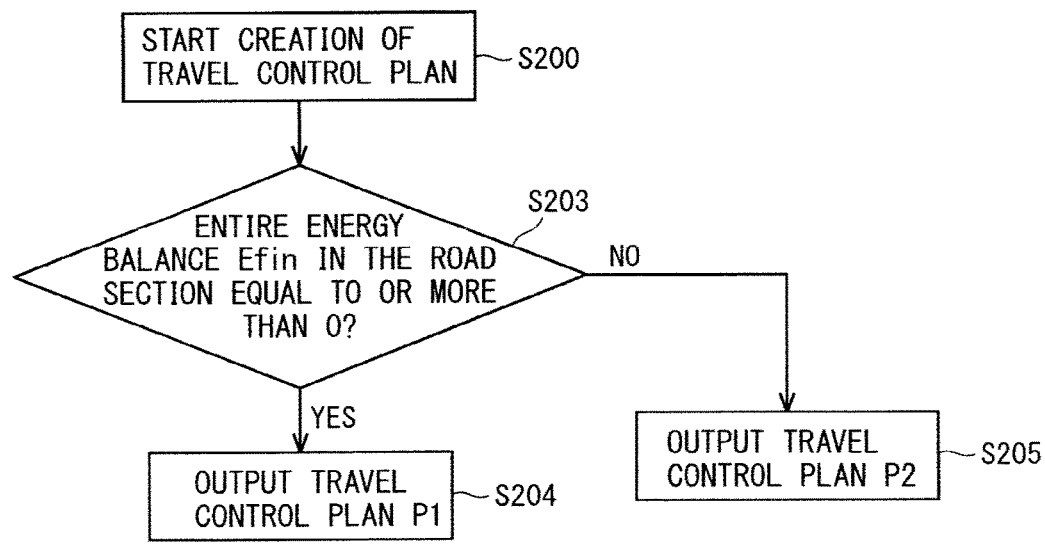
FIG. 10 is a flowchart illustrating creation and output of a travel control plan in the embodiment 2.

FIG. 10 is a flowchart illustrating creation and output of the travel control plan P in the embodiment 2. The processing illustrated in the flowchart is processing in which the steps S201, S202 in FIG. 6 are removed (therefore, the steps S206, S207 are also removed), and is a flow which shifts from the step S200 to the step S203. In the energy balance calculation (the formula (5)) in the step S203, as mentioned above, the calculation in which the second term and the third term of the right-hand side of the equality in the formula (5) is replaced with the electric energy quantity Ec is performed.

Figure 11:
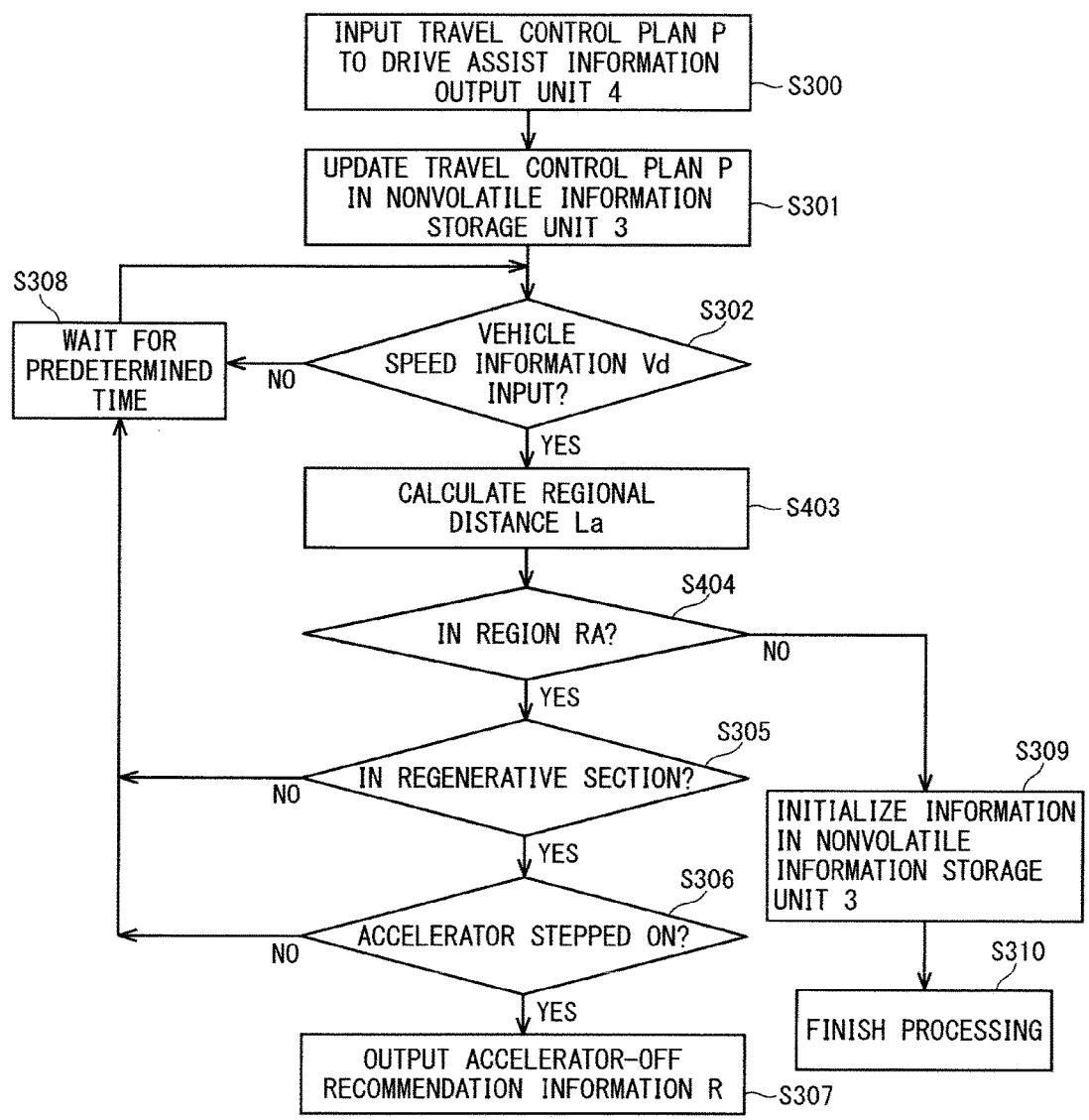
FIG. 11 is a flowchart illustrating processing of drive assist control of a drive assist information output unit in the embodiment 2.

FIG. 11 is a flowchart illustrating processing of drive assist control of a drive assist information output unit 4 in the embodiment 2. The flowchart is the one in which the steps S303, S304 in the flowchart illustrated in FIG. 8 are respectively replaced with steps S403, S404.

In the step S403, a regional travel distance La is calculated. The regional travel distance La is a distance in which the vehicle B travels in the region RA with a point where it has arrived at any of the end points K1 to K5 as a starting point. In the same way as the sectional travel distance Lv, the regional travel distance La is obtained from the formula (7) by using a traveling speed V(t) obtained from vehicle speed information Vd.

In the step S404, on the basis of the regional travel distance La, it is determined whether or not the vehicle B is in the region RA.

It should be noted that, since concrete processing which determines whether or not the vehicle B enters the region RA is realized by employing a known technique, the processing is not described here in detail. For example, it may be defined, assumed, or approximated that the region RA is a rectangle, and be determined whether or not latitude/longitude of a GPS indicated by current position information J is in the above-described rectangular region.

As the energy that the vehicle B consumes in the region RA, the electric energy quantity Ec is considered. The energy that the vehicle B consumes in the region RA may be treated by replacing with a gasoline quantity Gc consumed if the energy is energy required for traveling. Alternatively, both the electric energy quantity Ec and the gasoline quantity Gc may be treated in association with the region RA.

Effects of Embodiment 2

As described above, in a power management device 10 according to the embodiment 2, the road slope information is classified and managed by the predetermined electric energy quantity Ec consumed in traveling of the vehicle B. More specifically, even in a case where the vehicle B travels between any end points included in the boundary of the region, the road slope information is stored in the section valid road slope information storage unit 2 for every region where the predetermined electric energy quantity Ec is consumed. A road slope position in the region is held in coordinates.

In this, in the embodiment 2, even when a destination or a travel path is not determined, the travel control plan in the region is created, and the travel control plan contributes to travel in which energy is saved.

Further, as compared with the embodiment 1, it is possible to reduce the stored data quantity of the road slope information, and the section valid road slope information storage unit 2 can be realized by the less expensive device. Also, since the road slope information can be retrieved by narrowing in the road slope information belonging to the corresponding region RA, it is possible to improve a retrieval speed of the necessary road slope information.

Further, it is possible to create the travel control plan about a range called the region which is wider than that of the embodiment 1. Hence, the destination or the arrival path up to the destination (requested in Patent Document 1) is not required for creation of the travel control plan.

Embodiment 3

Next, a power management device in an embodiment 3 according to the present invention will be described. A factor which contributes to energy consumption is not only a road slope, and a change in a traveling speed also becomes the factor. To this problem, in the embodiment 3, a position where a speed change (acceleration or deceleration) of a motor vehicle is performed is utilized with a technique similar to the road slope information.

Figure 12:
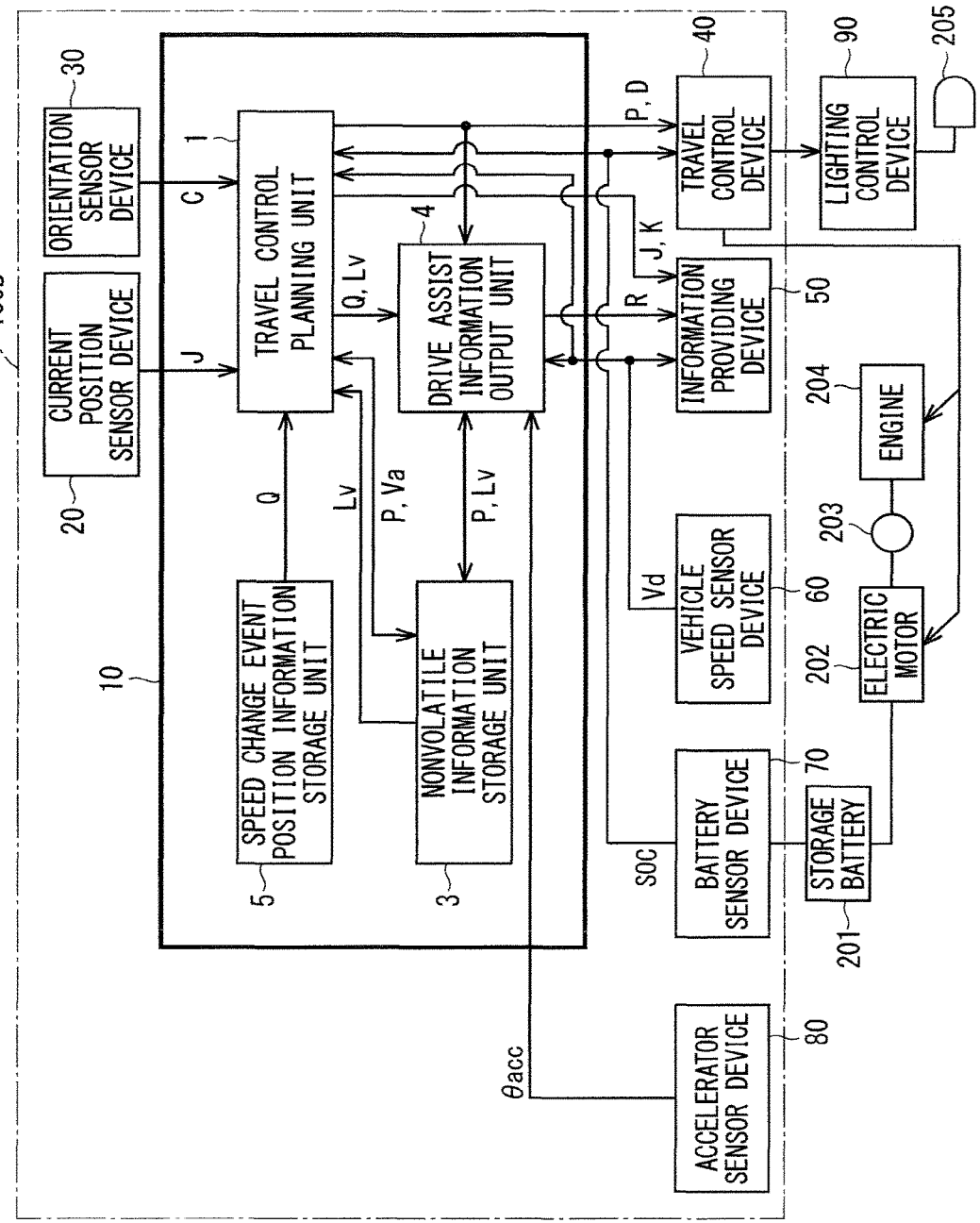
FIG. 12 is a block diagram illustrating a configuration of a power management device and a periphery thereof in an embodiment 3.

FIG. 12 is a block diagram illustrating a configuration of a power management system 1001B and a periphery thereof in the embodiment 3. The power management system 100B is mounted on a vehicle in the same way as the power management system 100A.

The power management system 100B has a configuration in which the section valid road slope information storage unit 2 of the power management system 100A is replaced with a speed change event position information storage unit 5.

Further, in the present embodiment, a travel control device 40 included in the power management system 100B also controls a lighting control device 90. The lighting control device 90 sets an angle for directing a headlight 205. For example, the travel control device 40 gives the angle to the lighting control device 90.

A start position and an end position of a curve having a curvature Rt or more is treated in the same way as the start position and the end position of the road slope in the embodiment 1 or the embodiment 2. A T-junction may be grasped as a "curve" having a very large curvature. Alternatively, it may be grasped as occurrence of an event called a temporary stop.

Table 5 shows a data storage example of event information in the speed change event position information storage unit 5.

a time of entering the curve (the regenerative energy can be generated at the deceleration) and accelerates at predetermined acceleration at an end of the curve is given as energy characteristic information. Hence, in the road section currently focused, an energy balance formula in the present embodiment is expressed in a formula (11) by subtracting the energy quantity Edc from the right-hand side of the equality (the left-hand side of the inequality) in the formula (5).

[Formula 11]

$$Efin = E0 - E1*(L1\_A + 1\_B + L1\_C) - (E2*L2) + E3*L3 - Edc > 0 \quad (11)$$

It should be noted that the event information, particularly start position information K which indicates a start position

TABLE 5

| | | | | | Event Information | | | | |
|---|---|---|---|---|---|---|---|---|---|
| | | | | | | | Position Information | | Energy Characteristic |
| Index | GPS Latitude | GPS Longitude | Traveling Orientation | Road Slope Information | Event Classification | | Start Position | End Position | Event Characteristic | (Negative Means Regeneration) |
| ID4 | 34° A' D" | 135° H' L" | 0° | | Right-hand Curve | 100 m | 200 m | Curvature X | −300 Wh |
| ID5 | 34° B' E" | 135° I' M" | 90° | | Left-hand Curve | 200 m | 300 m | Curvature Y | 400 Wh |
| ID6 | 34° C' F" | 135° J' N" | 270° | | T-junction | 300 m | 400 m | Temporary Stop | −100 Wh |

The event information is stored in the speed change event position information storage unit 5 in association with each road section shown in an index. More specifically, in addition to the road slope information illustrated in Table 1, the following event information is stored in association with each road section. However, in order to avoid a complication in Table 5, details of the road slope information are omitted. The event information can be also grasped as a part of the section road slope information.

The event information includes an event classification, position information, an event characteristic, and an energy characteristic. The event classification indicates that an event subjected to the event information is either a right-hand curve, a left-hand curve, or the T-junction. The position information includes a start position and an end position of the event. Here, a case where the start position and the end position are expressed by a route distance from the start position of the focused road section (for example, the cardinal point G in FIG. 3) is illustrated. The event characteristic indicates a curvature of the event. Alternatively, in a case where the event classification of the event is the T-junction, the event characteristic may be grasped as the temporary stop instead of the curvature.

The energy characteristic indicates an energy quantity Edc consumed by the event. However, a negative value of the value shown here indicates that the regenerative energy is obtained by the event.

Next, in a travel control planning unit 1, energy calculation which considers deceleration and acceleration before entering the curve or the T-junction is performed.

For example, in consideration of the embodiment 1, it is described that the energy quantity Edc [Wh] consumed when a vehicle decelerates at predetermined acceleration at of the event, is desirably transmitted with current position information J from the travel control planning unit 1 to an information providing device 50. When a traveling speed of the vehicle at a point of time when the vehicle approaches the start position for less than the predetermined distance (the information providing device 50 can recognize this from the vehicle speed information Vd) is a predetermined speed or more, the information providing device 50 gives a driver a notice of urging deceleration or the like.

When the travel control device 40 receives input of a travel control plan P, it is desirable that event information about the road section corresponding to the travel control plan P be also received from the travel control planning unit 1. In FIG. 12, event information D is added.

By obtaining the event information D, the travel control device 40 outputs the angle of the headlight 205 to the lighting control device 90 before the vehicle encounters the event, and more specifically, before it enters the curve or the T-junction. This is desirable from a viewpoint of securing a visibility of the driver who drives the vehicle. The angle may be set on the basis of the curvature shown in the event characteristic.

Needless to say, the energy characteristic of the event information is not required for processing of urging the driver to decelerate or adjusting the angle of the headlight 205. For the processing, the start position information K and the event characteristic (showing the curvature) are enough as the event information. Conversely, for calculation of the energy balance in the formula (11), the start position information K and the event characteristic are not required, and the energy characteristic is enough.

It should be noted that, in the embodiment 3, the section valid road slope information storage unit 2 is provided in the same way as the embodiment 1, and in addition to this, a storage unit which stores the event information may be provided.

Effects of Embodiment 3

In this way, in the embodiment 3, by considering the energy quantity consumed by the vehicle at the curve (including a crossroad), energy calculation accuracy required for the traveling in the embodiment 1, 2 is improved, and eventually, accuracy of the travel control is improved.

Further, the embodiment 3 also contributes to deceleration assist to the driver before entering the curve and to assistance for safe driving by the control of a lighting device, such as the headlight 205.

Embodiment 4

Next, a power management device in an embodiment 4 according to the present invention will be described. In the aforementioned embodiments 1, 2, 3, data of the section road slope information is stored in the section valid road slope information storage unit 2 as shown in Table 1. As explained using Table 3, this section road slope information is limited to the road section which shows the road slope steeper than the predetermined slope determined according to the vehicle characteristic of the vehicle. Accordingly, the data quantity of the section road slope information stored in the section valid road slope information storage unit 2 can be reduced.

However, for the motor vehicle with a heavy car weight, the aforementioned predetermined slope becomes small (see the formula (1)). As a result, there is a case where the data quantity of the section road slope information stored in the section valid road slope information storage unit 2 is not reduced.

In the embodiment 4, in consideration of such a case, in a path formed from a downward slope section to a downward slope section via a flat road section, by treating the downward slope sections adjacent to the flat road section as one downward slope section, section road slope information stored in a section valid road slope information storage unit 2 is reduced.

Figure 14:
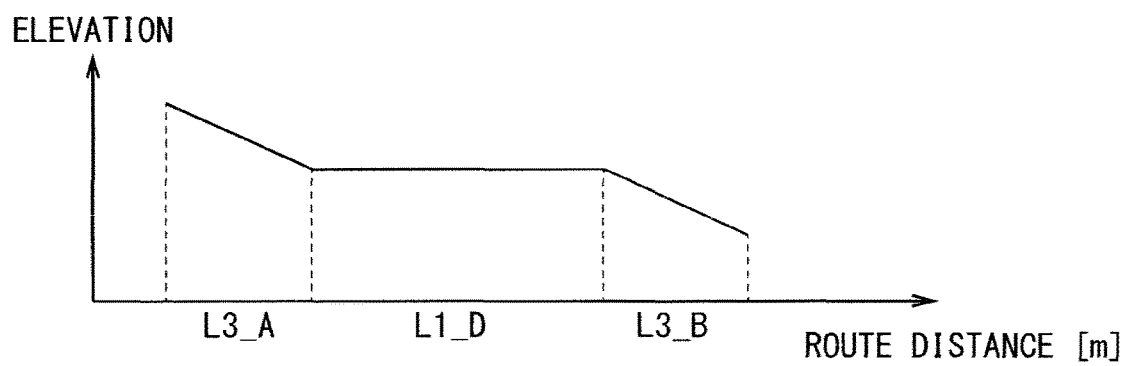
FIG. 14 is a graph illustrating a relationship between an elevation and a route distance of a road section.

FIG. 14 is a graph illustrating a relationship between an elevation and a route distance of a pair of adjacent downward slope sections with a flat road in between. A first downward slope section of a route distance L3_A starts from a starting point, the first downward slope section is followed by a flat road section of a route distance L1_D, and the flat road section is followed by a second downward slope section of a route distance L3_B.

In a case where such road sections exist, in the present embodiment as with the embodiments 1, 2, 3, the section road slope information about the flat road section is not stored in the section valid road slope information storage unit 2. In other words, regarding a case illustrated in FIG. 14, as illustrated in Table 6 in the embodiments 1, 2, 3, the section road slope information is stored by dividing into two indexes ID7, ID8. The indexes ID7, ID8 respectively correspond to the first downward slope section, the second downward slope section.

TABLE 6

| | | | | | Road Slope Information | | | | | |
| | | | | | | Upward Slope | | | Downward Slope | |
| Index | GPS Latitude | GPS Longitude | Traveling Orientation | Section Route Distance | Start Position | End Position | Road Slope | Start Position | End Position | Road Slope |
| ID7 | 34° A' G" | 135° V' W" | 0° | 300 m | — | — | — | 0 m | 300 m | 4% |
| ID8 | 34° A' Z" | 135° V' W" | 0° | 500 m | — | — | — | 0 m | 500 m | 6% |
| . | | | | | | | | | | |
| . | | | | | | | | | | |

Here, for simplicity, a traveling orientation of the road section illustrated in FIG. 14 is always 0 degrees. Accordingly, GPS longitude of the downward slope section illustrated in the index ID7 agrees with that of the downward slope section illustrated in the index ID8. Further, the route distance L3_A is set to 300 m, the route distance L1_D is set to 200 m, and the route distance L3_B is set to 500 m.

In the present embodiment, only in a case where an energy Ef consumed in traveling in the flat road section of the route distance L1_D is larger than a predetermined energy Efx, the two section road slope information indicated by the indexes ID7, ID8 as in Table 6 are stored. On the other hand, in a case where the energy Ef is the predetermined energy Efx or less, the road section illustrated in FIG. 14 is stored as the section road slope information shown by one index ID7 as in Table 7.

TABLE 7

| | | | | | Road Slope Information | | | | | |
| | | | | | | Upward Slope | | | Downward Slope | |
| Index | GPS Latitude | GPS Longitude | Traveling Orientation | Section Route Distance | Start Position | End Position | Road Slope | Start Position | End Position | Road Slope |
| ID7 | 34° A' G" | 135° V' W" | 0° | 1000 m | — | — | — | 0 m | 1000 m | 5% |
| . | | | | | | | | | | |
| . | | | | | | | | | | |

Here, the section route distance is a sum of the route distances L3_A, L1_D, L3_B, and 300+200+500=1000 m in the aforementioned example. Also, an average of a road slope in the first downward slope section and a road slope in the second downward slope section is employed as a road slope. Specifically, a road slope λt when grasping these three road sections together is expressed by a formula (12) by introducing a road slope λ1 in the first downward slope section and a road slope λ2 in the second downward slope section.

[Formula 12]

$$\lambda t=(\lambda 1+\lambda 2)\div 2 \quad (12)$$

According to Table 6 and Table 7, the road slope of 5% is obtained by dividing a sum of the road slope of 4% in the first downward slope section and the road slope of 6% in the second downward slope section by two.

The energy Ef is obtained by a formula (13) by introducing the electric energy quantity E1 [Wh/m] in Table 2.

[Formula 13]

$$Ef=E1\cdot L1\_D \quad (13)$$

A value previously calculated by an experiment or the like is utilized for the predetermined energy Efx. For example, energy corresponding to γ [%] of a battery mounted on a motor vehicle or corresponding to gasoline consumption δ [L] is employed for the predetermined energy Efx. In this way, as the predetermined energy Efx, it is desirable that the energy quantity which has an effect on a cruising range of the motor vehicle at a predetermined ratio or higher be set.

As the traveling speed V in the Table 2, an average traveling speed Va may be employed as mentioned above. Alternatively, as the traveling speed V, a value calculated from traffic statistical data, such as an average travel time, may be employed.

It should be noted that the present embodiment is not limited to the case where the pair of downward slope sections is adjacent with the one flat road section in between. For example, the present embodiment can be applied to a road section where (k−1) flat road sections are provided between k downward slope sections and these appear alternately (k is an integer of 2 or more). In this case, an electric energy quantity E1 [Wh/m] in the formula (13) is multiplied by a sum of respective route distances of these (k−1) flat road sections. Further, the road slope λt in the formula (12) is obtained as an arithmetic mean of respective road slopes of the k downward slope sections.

Further, the present embodiment 4 may be applied to a case of an upward slope. In other words, the present embodiment can be applied to, for example, a road section where (k−1) flat road sections are provided between k upward slope sections and these appear alternately.

Therefore, the embodiment 4 can be summarized as follows: In a case where two conditions of
(c) regardless of whether a direction of the slope is upward or downward, the plurality of road sections in the same direction are adjacent with only the flat road section in between; and
(d) the energy required when the vehicle travels in the flat road section is the predetermined energy or less are satisfied, the section road slope information in which the plurality of road sections and the flat road sections are gathered into one is stored in the section valid road slope information storage unit 2.

Effects of Embodiment 4

In the embodiment 4, as compared with the embodiments 1 to 3, the data quantity of the section road slope information stored in the section valid road slope information storage unit 2 can be further reduced, and it is possible to lower a specification required for hardware, such as a storage device.

Further, since granularity of the section road slope information stored in the section valid road slope information storage unit 2 becomes large and the number of data is reduced, retrieval of the data stored in the section valid road slope information storage unit 2 can be performed at a higher speed.

It should be noted that, in the present invention, the respective embodiments can be freely combined or the respective embodiments can be appropriately modified or omitted within the scope of the invention.

The present invention has been described in detail. However, the above description is illustration in all aspects, and the present invention is not limited thereto. It is understood that numerous variations that are not illustrated can be assumed without deviating from the scope of the present invention.

DESCRIPTION OF REFERENCE SIGNS

1 travel control planning unit; 2 section valid road slope information storage unit; 3 nonvolatile information storage unit; 10 power management device; 40 travel control device; 50 information providing device; 100A, 100B power management system; 201 storage battery (battery); 202 electric motor; B vehicle; Q section valid road slope information.

The invention claimed is:

1. A power management device comprising:
a memory configured to store road slope information including information about a slope of a road section in which a vehicle travels in association with said road section; and
processing circuit configured to
read said road slope information from said memory, and
generate a travel control plan for traveling of said vehicle on the basis of the road slope information, wherein
said road slope information, which shows a downward slope in traveling of the vehicle, has a slope steeper than a predetermined slope depending on the vehicle,
said predetermined slope is a slope according to a vehicle characteristic of said vehicle,
said vehicle characteristic includes at least any one of: a car weight of said vehicle and performance of a regenerative brake of said vehicle,
said road slope information includes a start position, an end position, and a slope of a regenerative road section serving as a portion of the road section in which regenerative energy can be obtained while said vehicle travels,
said vehicle has a storage battery storing said regenerative energy and is driven by using power, at least, stored in said storage battery as a power source, and
said processing circuitry is further configured to generate said travel control plan depending on results of determination of:
whether or not said vehicle can travel until arriving in said regenerative road section by the power stored in said storage battery, whether or not said storage battery can recover entire electric energy contributed to charging of said storage battery in said regenerative road section, and whether or not said vehicle can travel in said road section by the power.

2. The power management device according to claim 1, wherein
said processing circuitry is further configured to generate said travel control plan by using energy consumed when said vehicle travels a distance of a route serving as an upward slope in said traveling in said road section and a unit distance thereof, regenerative energy obtained when said vehicle travels a distance of a route serving as the downward slope in said traveling in said road section and a unit distance thereof, and energy consumed when said vehicle travels a distance of a route serving as a flat road in said road section and a unit distance thereof.

3. The power management device according to claim 1, wherein the energy consumed when said vehicle travels the unit distance of the road serving as the flat road in said road section depends on an average value of a traveling speed of said vehicle, and
when a difference between said average value used in generating said travel control plan and said average value during travel control based on said travel control plan is a predetermined value or more, said travel control plan is generated again.

4. The power management device according to claim 1, wherein said road slope information includes a start position, an end position, and a road slope of the road section in association with a plurality of road sections in a region where energy consumed in traveling of said vehicle is equal.

5. The power management device according to claim 1, wherein in a case where a plurality of road sections whose slope directions are in the same direction are adjacent with only a flat road section in between and energy required when the vehicle travels in the flat road section is predetermined energy or less, said road slope information is stored in said information storage unit by gathering skid plurality of road sections and said flat road section into one.

6. A power management system comprising:
the power management device according to claim 1; and
in a case where a mechanism for accelerating said vehicle is operated when said vehicle travels in said regenerative section, an information providing device for notifying information which recommends not to operate said mechanism.

7. A power management system comprising:
the power management device according to claim 1; and
circuitry configured to perform travel control of said vehicle on the basis of said travel control plan, wherein
said power management device further comprises a non-volatile storage device for respectively storing a travel distance of said vehicle in said road section successively and said travel control plan, and
after said vehicle travels on the basis of said travel control plan and operation of said travel control is temporarily stopped, in an initial operation after the operation is restarted, said circuitry resumes travel control on the basis of said travel distance and said travel control plan stored in said storage device.

8. A power management system comprising:
the power management device according to claim 2; and
circuitry configured to perform travel control of said vehicle on the basis of said travel control plan, wherein
said power management device further comprises a non-volatile storage device for respectively storing a travel distance of said vehicle in said road section successively and said travel control plan, and
after said vehicle travels on the basis of said travel control plan and operation of said travel control is temporarily stopped, in an initial operation after the operation is restarted, said circuitry resumes travel control on the basis of said travel distance and said travel control plan stored in said storage device.

9. A power management system comprising:
the power management device according to claim 3; and
circuitry configured to perform travel control of said vehicle on the basis of said travel control plan, wherein
said power management device further comprises a non-volatile storage device for respectively storing a travel distance of said vehicle in said road section successively and said travel control plan, and
after said vehicle travels on the basis of said travel control plan and operation of said travel control is temporarily stopped, in an initial operation after the operation is restarted, said circuitry resumes travel control on the basis of said travel distance and said travel control plan stored in said storage device.

10. A motor vehicle which is a motor vehicle mounted with the power management device according to claim 1 and serving as said vehicle.

11. A motor vehicle which is a motor vehicle mounted with the power management system according to claim 6 and serving as said vehicle.

12. A motor vehicle which is a motor vehicle mounted with the power management system according to claim 7 and serving as said vehicle.

13. The power management device according to claim 1, wherein:
said road slope information includes an electric energy quantity consumed or regenerated at a curve in said road section.

14. A motor vehicle which is a motor vehicle mounted with the power management system according to claim 13 and serving as said vehicle.

15. The power management device according to claim 1, wherein:
said road slope information includes a curvature of a curve in said road section.

16. A motor vehicle which is a motor vehicle mounted with the power management system according to claim 15 and serving as said vehicle.

17. A non-transitory computer readable medium storing thereon a program that when execrated by a computer causes the computer to implement a power management method comprising:
reading road slope information from a memory configured to store the road slope information including information about a slope of a road section in which a vehicle travels in association with said road section; and
generating a travel control plan for traveling of said vehicle on the basis of the road slope information,
wherein
said road slope information, which shows a downward slope in traveling of the vehicle, has a slope steeper than a predetermined slope depending on the vehicle,
said predetermined slope is a slope according to a vehicle characteristic of said vehicle,
said vehicle characteristic includes at least any one of a car weight of said vehicle and performance of a regenerative brake of said vehicle, said road slope information includes a start position, an end position, and a slope of a regenerative road section serving as a portion of the road section in which regenerative energy can be obtained while said vehicle travels, said vehicle has a storage battery storing said regenerative energy and is driven by using power, at least, stored in said storage battery as a power source, and said generating further comprises generating said travel control plan depending on results of determination of:

whether or not said vehicle can travel until arriving in said regenerative road section by the power stored in said storage battery, whether or not said storage battery can recover entire electric energy contributed to charging of said storage battery in said regenerative road section, and whether or not said vehicle can travel in said road section by the power.

18. A power management method comprising:

reading road slope information from a memory configured to store the road slope information including information about a slope of a road section in which a vehicle travels in association with said road section; and generating, using processing circuitry, a travel control plan for traveling of said vehicle on the basis of the road slope information, wherein said road slope information, which shows a downward slope in traveling of the vehicle, has a slope steeper than predetermined slope depending on the vehicle, said predetermined slope is a slope according to a vehicle characteristic of said vehicle, said vehicle characteristic includes at least any one of: a car weight of said vehicle and performance of a regenerative brake of said vehicle, said road slope information includes a start position, an end position, and a slope of a regenerative road section serving as a portion of the road section in which regenerative energy can be obtained while said vehicle travels, said vehicle has a storage battery storing said regenerative energy and is driven by using power, at least, stored in said storage battery as a power source, and said generating further comprises generating, using the processing circuitry, said travel control plan depending on results of determination of:

whether or of said vehicle can travel until arriving in said regenerative road section by the power stored in said storage battery, whether or not said storage battery can recover entire electric energy contributed to charging of said storage battery in said regenerative road section, and whether or not said vehicle can travel in said road section by the power.

* * * * *